US008404384B2

(12) United States Patent
Feaver et al.

(10) Patent No.: US 8,404,384 B2
(45) Date of Patent: *Mar. 26, 2013

(54) ULTRAPURE SYNTHETIC CARBON MATERIALS

(75) Inventors: Aaron M. Feaver, Seattle, WA (US); Henry R. Costantino, Woodinville, WA (US); William D. Scott, Seattle, WA (US)

(73) Assignee: EnerG2 Technologies, Inc., Seattle, WA (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/829,282

(22) Filed: Jul. 1, 2010

(65) Prior Publication Data

US 2011/0002086 A1 Jan. 6, 2011

Related U.S. Application Data

(60) Provisional application No. 61/222,431, filed on Jul. 1, 2009, provisional application No. 61/255,037, filed on Oct. 26, 2009, provisional application No. 61/255,054, filed on Oct. 26, 2009, provisional application No. 61/261,703, filed on Nov. 16, 2009.

(51) Int. Cl.
*H01M 4/38* (2006.01)
*C01B 31/00* (2006.01)

(52) U.S. Cl. .................. 429/231.8; 423/445 R
(58) Field of Classification Search .............. 423/445 R; 429/231.8
See application file for complete search history.

(56) References Cited

U.S. PATENT DOCUMENTS

| | | | |
|---|---|---|---|
| 4,082,694 A | 4/1978 | Wennerberg et al. | 252/444 |
| 4,159,913 A | 7/1979 | Birchall et al. | 106/307 |
| 4,198,382 A | 4/1980 | Matsui | 423/445 |
| 4,543,341 A | 9/1985 | Barringer et al. | 501/1 |
| 4,580,404 A | 4/1986 | Pez et al. | 62/55.5 |
| 4,862,328 A | 8/1989 | Morimoto et al. | 361/502 |
| 4,873,218 A | 10/1989 | Pekala | 502/418 |
| 4,954,469 A | 9/1990 | Robinson | 502/80 |
| 4,997,804 A | 3/1991 | Pekala | 502/418 |
| 5,260,855 A | 11/1993 | Kaschmitter et al. | 361/502 |
| 5,416,056 A | 5/1995 | Baker | 502/425 |
| 5,420,168 A | 5/1995 | Mayer et al. | 521/99 |
| 5,465,603 A * | 11/1995 | Anthony et al. | 72/467 |
| 5,508,341 A | 4/1996 | Mayer et al. | 524/596 |
| 5,529,971 A | 6/1996 | Kaschmitter et al. | 502/416 |
| 5,626,637 A | 5/1997 | Baker | 48/127.3 |
| 5,626,977 A | 5/1997 | Mayer et al. | 429/44 |
| 5,674,642 A | 10/1997 | Le et al. | 429/218 |
| 5,710,092 A | 1/1998 | Baker | 502/416 |
| 5,789,338 A | 8/1998 | Kaschmitter et al. | 502/418 |
| 5,858,486 A | 1/1999 | Metter et al. | 428/34.1 |
| 5,945,084 A | 8/1999 | Droege | 423/447.4 |
| 5,965,483 A | 10/1999 | Baker et al. | 502/425 |
| 6,006,797 A | 12/1999 | Bülow et al. | 141/3 |
| 6,064,560 A | 5/2000 | Hirahara et al. | 361/502 |
| 6,072,693 A | 6/2000 | Tsushima et al. | 361/502 |
| 6,096,456 A | 8/2000 | Takeuchi et al. | 429/249 |
| 6,225,257 B1 | 5/2001 | Putyera et al. | 502/432 |
| 6,309,446 B1 | 10/2001 | Nakanoya et al. | 95/102 |
| 6,574,092 B2 | 6/2003 | Sato et al. | 361/502 |
| 6,592,838 B1 | 7/2003 | Nomoto et al. | 423/445 R |
| 7,245,478 B2 | 7/2007 | Zhong et al. | 361/502 |
| 7,582,902 B2 * | 9/2009 | Tano et al. | 257/71 |
| 7,723,262 B2 | 5/2010 | Feaver et al. | 502/416 |
| 7,816,413 B2 | 10/2010 | Feaver et al. | 516/100 |
| 7,835,136 B2 | 11/2010 | Feaver et al. | 361/502 |
| 8,158,556 B2 | 4/2012 | Feaver et al. | |
| 8,293,818 B2 | 10/2012 | Costantino et al. | |
| 2002/0031706 A1 | 3/2002 | Dasgupta et al. | 429/212 |
| 2002/0031710 A1 | 3/2002 | Kezuka et al. | 429/303 |
| 2002/0114126 A1 | 8/2002 | Hirahara et al. | 361/302 |
| 2002/0168314 A1 | 11/2002 | Roemmler | 423/448 |
| 2002/0172637 A1 | 11/2002 | Chesneau et al. | 423/445 R |
| 2003/0064564 A1 | 4/2003 | Lin | 438/257 |
| 2003/0108785 A1 | 6/2003 | Wu et al. | 429/44 |
| 2003/0170548 A1 | 9/2003 | Otsuki et al. | 429/326 |
| 2005/0014643 A1 | 1/2005 | Lini et al. | |
| 2005/0041370 A1 | 2/2005 | Wilk et al. | 361/502 |
| 2005/0058589 A1 | 3/2005 | Lundquist et al. | 423/445 R |
| 2005/0079359 A1 | 4/2005 | Fujita et al. | 428/408 |
| 2005/0135993 A1 | 6/2005 | Xu et al. | 423/605 |
| 2006/0057355 A1 | 3/2006 | Suzuki et al. | 428/308.4 |
| 2006/0093915 A1 | 5/2006 | Lundquist et al. | 429/231.8 |
| 2006/0223965 A1 | 10/2006 | Trifu | 528/35 |
| 2006/0240979 A1 | 10/2006 | Hirahara et al. | 502/416 |
| 2007/0048605 A1 | 3/2007 | Pez et al. | |
| 2007/0113735 A1 | 5/2007 | Feaver et al. | 95/90 |
| 2007/0292732 A1 | 12/2007 | Feaver et al. | 429/33 |
| 2010/0097741 A1 | 4/2010 | Zhong et al. | 361/502 |
| 2010/0110613 A1 | 5/2010 | Zhong et al. | 361/502 |
| 2010/0331179 A1 | 12/2010 | Feaver et al. | 502/416 |
| 2011/0002086 A1 | 1/2011 | Feaver et al. | 361/502 |
| 2011/0028599 A1 | 2/2011 | Costantino et al. | 523/309 |
| 2011/0199716 A1 | 8/2011 | Feaver et al. | |

(Continued)

FOREIGN PATENT DOCUMENTS

| | | |
|---|---|---|
| EP | 1 514 859 A2 | 3/2005 |
| JP | 2004-5146367 A | 5/2004 |

(Continued)

OTHER PUBLICATIONS

Alcañiz-Monge et al., "Methane Storage in Activated Carbon Fibres," *Carbon* 35(2):291-297, 1997.

(Continued)

*Primary Examiner* — Stuart Henrickson
(74) *Attorney, Agent, or Firm* — Seed IP Law Group PLLC

(57) ABSTRACT

The present application is generally directed to ultrapure synthetic carbon materials having both high surface area and high porosity, ultrapure polymer gels and devices containing the same. The disclosed ultrapure synthetic carbon materials find utility in any number of devices, for example, in electric double layer capacitance devices and batteries. Methods for making ultrapure synthetic carbon materials and ultrapure polymer gels are also disclosed.

46 Claims, 15 Drawing Sheets

U.S. PATENT DOCUMENTS

| | | | |
|---|---|---|---|
| 2011/0223494 | A1 | 9/2011 | Feaver et al. |
| 2012/0081838 | A1 | 4/2012 | Costantino et al. |
| 2012/0202033 | A1 | 8/2012 | Chang et al. |
| 2012/0262127 | A1 | 10/2012 | Feaver et al. |
| 2013/0004841 | A1 | 1/2013 | Thompkins et al. |
| 2013/0020349 | A1 | 1/2013 | Feaver et al. |

FOREIGN PATENT DOCUMENTS

| | | | |
|---|---|---|---|
| JP | 2004-315283 | A | 11/2004 |
| JP | 2005-93984 | A | 4/2005 |
| JP | 2005-136397 | A | 5/2005 |
| JP | 2005-187320 | A | 7/2005 |
| WO | 02/39468 | A2 | 5/2002 |
| WO | WO 2004/099073 | A2 | 11/2004 |
| WO | WO 2007/061761 | A1 | 5/2007 |
| WO | WO 2011/002536 | A2 | 1/2011 |
| WO | WO 2011/003033 | A1 | 1/2011 |

OTHER PUBLICATIONS

Babić et al., "Characterization of carbon cryogel synthesized by sol-gel polycondensation and freeze-drying," *Carbon* 42:2617-2624, 2004.

Babić et al., "Characterization of carbon cryogels synthesized by sol-gel polycondensation," *J. Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Bock et al., "Structural Investigation of Resorcinol Formaldehyde and Carbon Aerogels Using SAXS and BET," *Journal of Porous Materials* 4:287-294, 1997.

Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.

Butler et al., "Braking Performance Test Procedure for Hybrid Vehicle Energy Storage Systems: Capacitor Test Results," *Joint International Meeting of the Electrochemical Society*, Abstract 684, Honolulu, HI, Oct. 3-8, 2004, 5 pages.

Chmiola et al., "Anomalous Increase in Carbon Capacitance at Pore Sizes Less Than 1 Nanometer," *Science* 313:1760-1763, Sep. 22, 2006.

Conway et al., "Partial Molal Volumes of Tetraalkylammonium Halides and Assignment of Individual Ionic Contributions," *Trans. Faraday Soc.* 62:2738-2749, 1966.

Czakkel et al., "Influence of drying on the morphology of resorcinol-formaldehyde-based carbon gels," *Microporous and Mesoporous Materials* 86:124-133, 2005.

Ding et al., "How Conductivities and Viscosities of PC-DEC and PC-EC Solutions of $LiBF_4$, $LiPF_6$, LiBOB, $Et_4NBF_4$ and $Et_4NBF_6$ Differ and Why," *Journal of The Electrochemical Society* 151(12):A2007-A2015, 2004.

Edward, "Molecular Volumes and the Stokes-Einstein Equation," *Journal of Chemical Education* 47(4):261-270, Apr. 1970.

Eikerling et al., "Optimized Structure of Nanoporous Carbon-Based Double-Layer Capacitors," *Journal of The Electrochemical Society* 152(1):E24-E33, 2005.

Endo et al., "Morphology and organic EDLC applications of chemically activated AR-resin-based carbons," *Carbon* 40:2613-2626, 2002.

Feaver et al., "Activated carbon cryogels for low pressure methane storage," *Carbon* 44:590-593, 2006.

Gouérec et al., "Preparation and Modification of Polyacrylonitrile Microcellular Foam Films for Use as Electrodes in Supercapacitors," *Journal of the Electrochemical Society* 148(1):A94-A101, 2001.

Hahn et al., "A dilatometric study of the voltage limitation of carbonaceous electrodes in aprotic EDLC type electrolytes by charge-induced strain," *Carbon* 44:2523-2533, 2006.

Hirscher et al., "Are carbon nanostructures an efficient hydrogen storage medium?" *Journal of Alloys and Compounds* 356-357:433-437, 2003.

Hsieh et al., "Synthesis of mesoporous carbon composite and its electric double-layer formation behavior," *Microporous and Mesoporous Materials* 93:232-239, 2006.

Hu et al., "Effects of electrolytes and electrochemical pretreatments on the capacitive characteristics of activated carbon fabrics for supercapacitors," *Journal of Power Sources* 125:299-308, 2004.

Inomata et al., "Natural gas storage in activated carbon pellets without a binder," *Carbon* 40:87-93, 2002.

International Preliminary Report on Patentability for International Application No. PCT/US2006/044524, mailed May 27, 2008, 7 pages.

International Preliminary Report on Patentability for International Application No. PCT/US2007/084886, mailed May 19, 2009, 7 pages.

International Search Report and Written Opinion for International Application No. PCT/US2006/044524, mailed Apr. 11, 2007, 8 pages.

International Search Report and Written Opinion for International Application No. PCT/US2007/84886, mailed Jun. 11, 2008, 11 pages.

International Search Report and Written Opinion for International Application No. PCT/US2010/40836, mailed Sep. 8, 2010, 12 pages.

Khomenko et al., "High-voltage asymmetric supercapacitors operating in aqueous electrolyte," *Appl. Phys. A* 82:567-573, 2006.

Kocklenberg et al., "Texture control of freeze-dried resorcinol-formaldehyde gels," *Journal of Non-Crystalline Solids* 225:8-13, 1998.

Kowalczyk et al., "Estimation of the pore-size distribution function from the nitrogen adsorption isotherm. Comparison of density functional theory and the method of Do and co-workers," *Carbon* 41:1113-1125, 2003.

Lozano-Castelló et al., "Powdered Activated Carbons and Activated Carbon Fibers for Methane Storage: A Comparative Study," *Energy & Fuels* 16:1321-1328, 2002.

Lozano-Castelló et al., "Influence of pore structure and surface chemistry on electric double layer capacitance in non-aqueous electrolyte," *Carbon* 41:1765-1775, 2003.

Miller, "Pulse Power Performance of Electrochemical Capacitors: Technical Status of Present Commercial Devices," *Proceedings of the 8th International Seminar on Double Layer Capacitors and Similar Energy Storage Devices*, Deerfield Beach, Florida, Dec. 7-9, 1998, 9 pages.

Pekala, "Organic aerogels from the polycondensation of resorcinol with formaldehyde," *Journal of Materials Science* 24:3221-3227, 1989.

Pekala et al., "Structure of Organic Aerogels. 1. Morphology and Scaling," *Macromolecules* 26:5487-5493, 1993.

Perrin et al., "Methane Storage within Dry and Wet Active Carbons: A Comparative Study," *Energy & Fuels* 17:1283-1291, 2003.

Qu et al., "Studies of activated carbons used in double-layer capacitors," *Journal of Power Sources* 74:99-107, 1998.

Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.

Reichenauer et al., "Microporosity in carbon aerogels," *Journal of Non-Crystalline Solids* 225:210-214, 1998.

Salitra et al., "Carbon Electrodes for Double-Layer Capacitors I. Relations Between Ion and Pore Dimensions," *Journal of the Electrochemical Society* 147(7):2486-2493, 2000.

Setoyama et al., "Simulation Study on the Relationship Between a High Resolution $\alpha_S$-Plot and the Pore Size Distribution for Activated Carbon," *Carbon* 36(10):1459-1467, 1998.

Simon et al., "Materials for electrochemical capacitors," *Nature Materials* 7:845-854, Nov. 2008.

Takeuchi et al., "Removal of single component chlorinated hydrocarbon vapor by activated carbon of very high surface area," *Separation and Purification Technology* 15:79-90, 1999.

Tamon et al., "Preparation of mesoporous carbon by freeze drying," *Carbon* 37:2049-2055, 1999.

Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.

Wei et al., "A novel electrode material for electric double-layer capacitors," *Journal of Power Sources* 141:386-391, 2005.

Xie et al., "Pore size control of Pitch-based activated carbon fibers by pyrolytic deposition of propylene," *Applied Surface Science 250*:152-160, 2005.

Yamamoto et al., "Control of mesoporosity of carbon gels prepared by sol-gel polycondensation and freeze drying," *Journal of Non-Crystalline Solids 288*:46-55, 2001.

Yang et al., "Preparation of highly microporous and mesoporous carbon from the mesophase pitch and its carbon foams with KOH," *Carbon 42*:1872-1875, 2004.

Costantino, Henry R. et al., "Manufacturing Methods for the Production of Carbon Materials", U.S. Appl. No. 13/624,689, filed Sep. 21, 2012.

Thompkins, Leah A. et al., "Hard Carbon Materials", U.S. Appl. No. 13/740,110, filed Jan. 11, 2013.

* cited by examiner

ULTRAPURE SYNTHETIC CARBON MATERIALS

CROSS-REFERENCES TO RELATED APPLICATIONS

The present application claims the benefit under 35 U.S.C. §119(e) of U.S. Provisional Patent Application No. 61/222,431 filed on Jul. 1, 2009; U.S. Provisional Patent Application No. 61/255,037 filed on Oct. 26, 2009; U.S. Provisional Patent Application No. 61/255,054 filed on Oct. 26, 2009; and U.S. Provisional Patent Application No. 61/261,703 filed on Nov. 16, 2009; all of which are incorporated herein by reference in their entireties.

STATEMENT OF GOVERNMENT INTEREST

Partial funding of the work described herein was provided by the U.S. Government under Contract No. W15P7T-09-C-S311 provided by the Department of Defense. The U.S. Government may have certain rights in this invention.

BACKGROUND

1. Technical Field

The present invention generally relates to ultrapure synthetic carbon materials, methods for making the same and devices containing the same.

2. Description of the Related Art

Activated carbon is commonly employed in electrical storage and distribution devices. The high surface area, conductivity and porosity of activated carbon allows for the design of electrical devices having higher energy density than devices employing other materials. Electric double-layer capacitors (EDLCs) are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly use in electrice vehicles such as electric cars, trains, buses and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles and/or upon aging. This decreased performance has been attributed to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

Although the need for higher purity carbon materials having both high surface area and high porosity has been recognized, such carbon material is not commercially available and no reported preparation method is capable of yielding the high purity carbon desired for high performance electrical devices. One common method for producing high surface area activated carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in low process yields and a carbon material having an ash content (i.e., metal impurities) of 1% or higher.

Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. However, such chemical activation produces activated carbon materials with a high level of residual process impurities (e.g., metals).

Another approach for producing high surface area activated carbon materials is to prepare a synthetic polymer from carbon-containing organic building blocks (e.g., a ultrapure polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. However, as with carbon materials prepared from other known methods, activated carbon materials prepared from synthetic polymers via reported methods contain unsuitable levels of impurities (e.g., metals).

While significant advances have been made in the field, there continues to be a need in the art for highly pure carbon materials, as well as for methods of making the same and devices containing the same. The present invention fulfills these needs and provides further related advantages.

BRIEF SUMMARY

In general terms, the present invention is directed to ultrapure synthetic carbon materials, as well as to methods for making such materials and to devices containing the same. Such materials find application in the context of electrical storage and distribution devices, particularly for use in electrodes for EDLCs and batteries. Existing carbon materials contain residual levels of various impurities (e.g., chlorine, sulfur, metals, etc.) which are known to decrease the breakdown voltage of the electrolyte in which the electrodes are immersed. Thus, existing electrodes must be operated at lower voltages and have a shorter life span than devices comprising the ultrapure synthetic carbon materials of this invention. The impurities in carbon electrodes also contribute to degradation of other components within an EDLC or battery. For example the porous membrane which separates the two carbon electrodes in an EDLC may be degraded by chlorine or other impurities within the carbon electrode. The ultrapure synthetic carbon materials disclosed herein are significantly more pure than any known carbon materials and thus improve the operation of any number of electrical storage and/or distribution devices Accordingly, in one embodiment, an ultrapure synthetic carbon material is disclosed. The ultrapure synthetic carbon material comprises a total impurity content of less than 500 ppm of elements having atomic numbers ranging from 11 to 92 as measured by proton induced x-ray emission. In another embodiment of the foregoing, the carbon material is an ultrapure synthetic amorphous carbon material.

In other embodiments, the ultrapure synthetic carbon material or ultrapure synthetic amorphous carbon material comprises a total impurity content of less than 200 ppm of elements having atomic numbers ranging from 11 to 92 as measured by proton induced x-ray emission.

In other embodiments, the ultrapure synthetic carbon material or ultrapure synthetic amorphous carbon material comprises an ash content of less than 0.03%, for example less than 0.01%, as calculated from proton induced x-ray emission data.

In other embodiments, the ultrapure synthetic carbon material or ultrapure synthetic amorphous carbon material comprises at least 95% carbon by weight as measured by combustion analysis and proton induced x-ray emission.

In other embodiments, the ultrapure synthetic carbon material or ultrapure synthetic amorphous carbon material comprises less than 3 ppm iron, less than 1 ppm nickel, less than 5 ppm sulfur, less than 1 ppm chromium or less than 1 ppm copper as measured by proton induced x-ray emission.

In other embodiments, the ultrapure synthetic carbon material or ultrapure synthetic amorphous carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. For example, in some embodiments, the ultrapure synthetic carbon material or ultrapure synthetic amorphous carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc as measured by proton induced x-ray emission.

In other embodiments, the ultrapure synthetic carbon material or ultrapure synthetic amorphous carbon material comprises less than 3.0% oxygen, less than 0.1% nitrogen and less than 0.5% hydrogen as determined by combustion analysis. For example, in other specific embodiments, the ultrapure synthetic carbon material or ultrapure synthetic amorphous carbon material comprises less than 1.0% oxygen as determined by combustion analysis.

In other embodiments, the ultrapure synthetic carbon material or ultrapure synthetic amorphous carbon material comprises a pyrolyzed ultrapure polymer cryogel. While in other embodiments, the ultrapure synthetic carbon material or ultrapure synthetic amorphous carbon material comprises an activated ultrapure polymer cryogel.

In some other embodiments, the ultrapure synthetic carbon material or ultrapure synthetic amorphous carbon material comprises a BET specific surface area of at least 1500 m$^2$/g, at least 2000 m$^2$/g or at least 2400 m$^2$/g.

In other embodiments, the ultrapure synthetic carbon material or ultrapure synthetic amorphous carbon material comprises a pore volume of at least 0.7 cc/g.

In another embodiment, an ultrapure polymer gel is provided. The ultrapure polymer gel comprises carbon, hydrogen, oxygen and a total impurity content of less than 500 ppm, and typically less than 200 ppm, of elements having atomic numbers ranging from 11 to 92 as measured by proton induced x-ray emission.

In some embodiments, the ultrapure polymer gel is a dried ultrapure polymer gel. In another embodiment, the ultrapure polymer gel comprises a BET specific surface area of at least 400 m$^2$/g.

In some other embodiments, the ultrapure polymer gel is prepared by admixing one or more miscible solvents, one or more phenolic compounds, one or more aldehydes and one or more catalysts. For example, in some embodiments, the ultrapure polymer gel is prepared by admixing water, acetic acid, resorcinol, formaldehyde and ammonium acetate.

This high purity of the disclosed carbon materials can be attributed to the disclosed sol gel process. Applicants have discovered that when one or more polymer precursors, for example a phenolic compound and an aldehyde, are co-polymerized under acidic conditions in the presence of a volatile basic catalyst, an ultrapure polymer gel results. This is in contrast to other reported methods for the preparation of ultrapure polymer gels which result in ultrapure polymer gels comprising residual levels of metals and/or other impurities as well as residual levels of reaction solvent and/or extraction solvent. Preparation of carbon materials from these impure ultrapure polymer gels, for example by pyrolysis and/or activation, results in carbon materials which are also impure.

The disclosed ultrapure synthetic amorphous carbon material may be made from the ultrapure polymer gel by pyrolysis and/or activation of the ultrapure polymer gel The ultrapure polymer gel, in turn, may be made by reacting one or more polymer precursors under acidic conditions in the presence of a volatile basic catalyst to obtain a ultrapure polymer gel.

Accordingly, in one embodiment the present disclosure provides a method for making an ultrapure synthetic carbon material, the method comprising reacting one or more polymer precursors under acidic conditions in the presence of a volatile basic catalyst to obtain an ultrapure polymer gel. In a further embodiment, the carbon material is an ultrapure synthetic amorphous carbon material.

In other embodiments, the method further comprises admixing the one or more polymer precursors in a solvent comprising acetic acid and water. In other embodiments, the volatile basic catalyst comprises ammonium carbonate, ammonium bicarbonate, ammonium acetate, ammonium hydroxide, or combinations thereof, and in other embodiments the one or more polymer precursors comprise resorcinol and formaldehyde.

In some other embodiments, the method further comprises:
(a) freeze drying the ultrapure polymer gel to obtain an ultrapure polymer cryogel;
(b) pyrolyzing the ultrapure polymer cryogel to obtain a pyrolyzed ultrapure cryogel; and
(c) activating the pyrolyzed ultrapure cryogel to obtain ultrapure synthetic activated carbon material.

The ultrapure synthetic amorphous carbon material finds utility in any number of electrical storage and distribution devices. The combination of ultrapurity, high porosity and high surface area allows for the preparation of electrical storage and distribution devices having properties superior to known devices. The devices comprising the ultrapure synthetic amorphous carbon material are capable of operation at higher voltages for longer periods of time at higher temperatures than comparable devices prepared from lower purity carbon.

Accordingly, in another embodiment the present disclosure provides a device comprising an ultrapure synthetic carbon material, wherein the ultrapure synthetic carbon material comprises a total impurity content of less than 500 ppm, particularly 200 ppm, of elements having atomic numbers ranging from 11 to 92 as measured by proton induced x-ray emission. For example, in some other embodiments of the foregoing the carbon material is an ultrapure synthetic amorphous carbon material.

In some further embodiments the device is an electric double layer capacitor (EDLC) device comprising:
 a) a positive electrode and a negative electrode wherein each of the positive and the negative electrodes comprise the ultrapure synthetic carbon material;
 b) an inert porous separator; and
 c) an electrolyte;
 wherein the positive electrode and the negative electrode are separated by the inert porous separator.

In some further embodiments, the EDLC device comprises a gravimetric power of at least 15 W/g, a volumetric power of at least 10 W/cc, a gravimetric energy of at least 20.0 Wh/kg or a volumetric energy of at least 10.0 Wh/liter.

In some other embodiments, the EDLC device comprises a gravimetric capacitance of at least of at least 25 F/g or a volumetric capacitance of at least of at least 20 F/cc as measured by constant current discharge from 2.7 V to 0.1 V with a 5 second time constant employing a 1.8 M solution of tetraethylammonium-tetrafluororoborate in acetonitrile electrolyte and a current density of 0.5 A/g.

In some other further embodiments of the EDLC device, the ash content of the carbon material is less than 0.03%, particularly less than 0.01%, as calculated from proton induced x-ray emission data, and in some other embodiments the carbon material comprises at least 95% carbon as measured by combustion analysis and proton induced x-ray emission.

In some other embodiments of the EDLC device, the carbon material comprises less than 3 ppm iron, less than 1 ppm nickel, less than 5 ppm sulfur, less than 1 ppm chromium or less than 1 ppm copper as measured by proton induced x-ray emission.

In yet other embodiments of the EDLC device, the carbon material comprises less than 100 ppm sodium, less than 300 ppm silicon, less than 100 ppm calcium, less than 50 ppm sulfur, less than 20 ppm iron, less than 10 ppm nickel, less than 140 ppm copper, less than 5 ppm chromium and less than 5 ppm zinc as measured by proton induced x-ray emission.

In some other embodiments of the EDLC device, the carbon material comprises an activated ultrapure polymer cryogel, and in some other embodiments of the EDLC device the carbon material comprises a BET specific surface area of at least 1500 m²/g, at least 2000 m²/g or at least 2400 m²/g.

In other particular embodiments, the present disclosure is directed to a battery, for example a lithium/carbon battery, zinc/carbon battery, lithium air battery or lead acid battery, comprising an ultrapure synthetic carbon material or ultrapure synthetic amorphous carbon material as disclosed herein. In other embodiments, the present disclosure is directed to an electrode comprising an ultrapure synthetic carbon material or ultrapure synthetic amorphous carbon material as disclosed herein. Such electrodes are useful in electrical storage and distribution devices, such as EDLCs and batteries.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
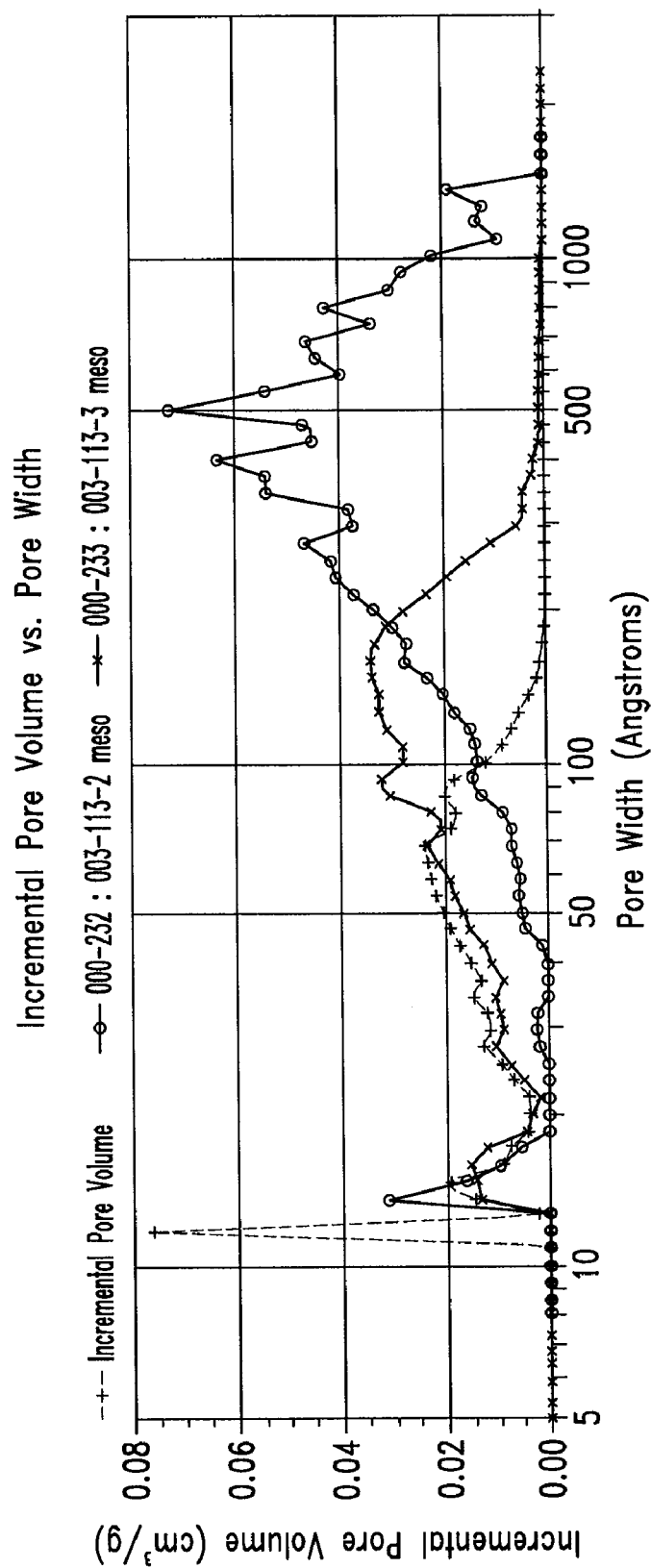
FIG. 1 shows incremental pore volume vs. pore width for RF ultrapure polymer cryogels produced from 100% acetic acid solvent.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

"Carbon material" refers to a material or substance comprised substantially of carbon. Carbon materials include both amorphous and crystalline carbon materials. Examples of carbon materials include, but are not limited to, activated carbon, pyrolyzed dried ultrapure polymer gels, pyrolyzed ultrapure polymer cryogels, pyrolyzed ultrapure polymer xerogels, pyrolyzed ultrapure polymer aerogels, activated dried ultrapure polymer gels, activated ultrapure polymer cryogels, activated ultrapure polymer xerogels, activated ultrapure polymer aerogels and the like.

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to a foreign substance (e.g., an element) within a material which differs from the chemical composition of the base material. For example, an impurity in an ultrapure synthetic carbon material or an ultrapure synthetic amorphous carbon material refers to any element or combination of elements, other than carbon, which is present in the ultrapure synthetic carbon material or the ultrapure synthetic amorphous carbon material. Impurity levels are typically expressed in parts per million (ppm).

"PIXE impurity" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, an ultrapure polymer gel, an ultrapure synthetic carbon material or an ultrapure synthetic amorphous carbon material. PIXE impurity concentrations and identities may be determined by proton induced x-ray emission (PIXE).

"Ultrapure" refers to a substance having a total PIXE impurity content of less than 0.050%. For example, an "ultrapure carbon material", "ultrapure synthetic carbon material" or "ultrapure synthetic amorphous carbon material" is a carbon material having a total PIXE impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to the compounds used in the preparation of a synthetic polymer. Examples of polymer precursors that can be used in the preparations disclosed herein include, but are not limited to aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a ultrapure polymer gel as described herein can be any compound that facilitates the polymerization of the polymer precusers to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried ultrapure polymer gel" refers to a gel or ultrapure polymer gel, respectively, from which the solvent, generally water, or mixture of water and one or more water-miscible solvents, has been substantially removed.

"Pyrolyzed dried ultrapure polymer gel" refers to a dried ultrapure polymer gel which has been pyrolyzed but not yet activated, while an "activated dried ultrapure polymer gel" refers to a dried ultrapure polymer gel which has been activated.

"Cryogel" refers to a dried gel that has been dried by freeze drying. Analogously, an "ultrapure polymer cryogel" is a dried ultrapure polymer gel that has been dried by freeze drying.

"RF cryogel" or "RF ultrapure polymer cryogel" refers to a dried gel or dried ultrapure polymer gel, respectively, that has been dried by freeze drying wherein the gel or ultrapure polymer gel was formed from the catalyzed reaction of resorcinol and formaldehyde.

"Pyrolyzed cryogel" or "pyrolyzed ultrapure polymer cryogel" is a cryogel or ultrapure polymer cryogel, respectively, that has been pyrolyzed but not yet activated.

"Activated cryogel" or "activated ultrapure polymer cryogel" is a cryogel or ultrapure polymer cryogel, respectively, which has been activated to obtain activated carbon material.

"Xerogel" refers to a dried gel that has been dried by air drying, for example, at or below atmospheric pressure. Analogously, a "ultrapure polymer xerogel" is a dried ultrapure polymer gel that has been dried by air drying.

"Pyrolyzed xerogel" or "pyrolyzed ultrapure polymer xerogel" is a xerogel or ultrapure polymer xerogel, respectively, that has been pyrolyzed but not yet activated.

"Activated xerogel" or "activated ultrapure polymer xerogel" is a xerogel or ultrapure polymer xerogel, respectively, which has been activated to obtain activated carbon material.

"Aerogel" refers to a dried gel that has been dried by supercrtical drying, for example, using supercritical carbon dioxide. Analogously, an "ultrapure polymer aerogel" is a dried ultrapure polymer gel that has been dried by supercritical drying.

"Pyrolyzed aerogel" or "pyrolyzed ultrapure polymer aerogel" is an aerogel or ultrapure polymer aerogel, respectively, that has been pyrolyzed but not yet activated.

"Activated aerogel" or "activated ultrapure polymer aerogel" is an aerogel or ultrapure polymer aerogel, respectively, which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g. carbon dioxide, oxygen, or steam) to produce an "activated" substance (e.g. activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example an ultrapure synthetic carbon material or an ultrapure synthetic amorphous carbon material, which has undergone the process of activation.

"Carbonizing", "pyrolyzing", "carbonization" and "pyrolysis" each refer to the process of heating a carbon-containing substance at a pyolysis dwell temperature in an inert atmosphere (e.g., argon or nitrogen) or in a vacuum such that the targeted material collected at the end of the process is primarily carbon. "Pyrolyzed" refers to a material or substance, for example an ultrapure synthetic carbon material or ultrapure synthetic amorphous carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried ultrapure polymer gels, pyrolyzed ultrapure polymer cryogels, pyrolyzed ultrapure polymer xerogels, pyrolyzed ultrapure polymer aerogels, activated dried ultrapure polymer gels, activated ultrapure polymer cryogels, activated ultrapure polymer xerogels, activated ultrapure polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution, and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Tunable" refers to an ability to adjust up or down the pore size, pore volume, surface area, density, pore size distribution, pore length or combinations thereof of either or both of the mesopores and micropores of a carbon material. For example, tunability may refer to adjusting pore size to accommodate targeted electrolyte ions, as appropriate when the ultrapure synthetic amorphous carbon materials described herein are employed as electrode materials. In some embodiments, the pore structure of an ultrapure synthetic carbon material or an ultrapure synthetic amorphous carbon material can be tuned. For example, in the preparation of an ultrapure synthetic carbon material or ultrapure synthetic amorphous carbon material, tuning the pore structure can be accomplished a number of ways, including but not limited to, varying parameters in the production of a ultrapure polymer gel; varying parameters in the freeze-drying of the ultrapure polymer gel; varying parameters in the carbonizing of the ultrapure polymer cryogel; and varying the parameters in the activation of the pyrolyzed ultrapure polymer cryogel.

"Electrode" refers to a conductor through which electricity enters or leaves an object, substance, or region.

"Binder" refers to a material capable of holding individual particles of carbon together such that after mixing a binder and carbon together the resulting mixture can be formed into sheets, pellets, disks or other shapes. Non-exclusive examples of binders include fluoroultrapure polymers, such as, for example, PTFE (polytetrafluoroethylene, Teflon), PFA (perfluoroalkoxy ultrapure polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte, that is it does not absorb a significant amount of ions or change chemically, e.g., degrade.

"Conductive" refers to the ability of a material to conduct electrons through transmission of loosely held valence electrons.

"Electrolyte" means a substance containing free ions such that the substance is electrically conductive. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1 ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

A. Ultrapure Polymer Gels and Ultrapure Synthetic Carbon Material

In one embodiment, an ultrapure synthetic carbon material is provided. In another embodiment, an ultrapure synthetic amorphous carbon material is provided. As discussed above, electrodes comprising carbon materials having residual levels of various impurities (e.g., chlorine, sulfur, metals, etc.) are known to decrease the breakdown voltage of the electrolyte in which the electrodes are immersed. Thus, these electrodes must be operated at lower voltages and have a shorter life span than devices comprising higher purity carbon. The impurities in carbon electrodes are also thought to contribute to degradation of other components within an EDLC or battery. For example the porous membrane which separates the two carbon electrodes in an EDLC may be degraded by chlorine or other impurities within the carbon electrode. The ultrapure synthetic carbon materials and ultrapure synthetic amorphous carbon materials disclosed herein are significantly more pure than any known carbon materials and are thus expected to improve the operation of any number of electrical storage and/or distribution devices.

This high purity of the disclosed carbon materials can be attributed to the disclosed sol gel process. Applicants have discovered that when one or more polymer precursors, for example a phenolic compound and an aldehyde, are co-polymerized under acidic conditions in the presence of a volatile basic catalyst, an ultrapure polymer gel results. This is in contrast to other reported methods for the preparation of polymer gels which result in polymer gels comprising residual levels of metals and/or other impurities as well as residual levels of reaction solvent and/or extraction solvent. Preparation of Carbon Materials from these Impure Polymer Gels, for Example by pyrolysis and/or activation, results in carbon materials which are also impure.

Contrary to known methods for the preparation of carbon materials, the disclosed ultrapure polymer gels allow for the preparation of ultrapure synthetic carbon materials and ultrapure synthetic amorphous carbon materials. For example, the ultrapure polymer gels can be pyrolyzed by heating in an inert atmosphere (e.g., nitrogen) to yield the disclosed carbon materials comprising a high surface area and high pore volume. These carbon materials can be further activated without the use of chemical activation techniques—which introduce impurities—to obtain the disclosed ultrapure activated carbon materials. Such materials find utility in any number of electrical storage and distribution applications.

The carbon materials prepared by the disclosed method are not only ultrapure, they also comprise desirable physical properties such as high porosity and high surface area. As with ultrapurity, the high porosity and high surface area of the disclosed carbon materials is a result of the unique process disclosed herein. The disclosed process allows for variation of a number of process parameters to control the physical properties of the carbon materials. The combination of ultrapurity, high porosity and high surface area allows for the preparation of electrical storage and distribution devices having properties superior to known devices.

The properties of the disclosed ultrapure polymer gels, ultrapure synthetic carbon materials and ultrapure synthetic amorphous carbon materials, as well as methods for their preparation are discussed in more detail below.

1. Ultrapure Polymer Gels

Ultrapure polymer gels are intermediates in the preparation of the disclosed ultrapure carbon materials. As such, the physical and chemical properties of the ultrapure polymer gels contribute to the properties of the ultrapure carbon materials. Accordingly, in some embodiments the ultrapure polymer gel is a dried ultrapure polymer gel, for example, in some embodiments the dried ultrapure polymer gel is an ultrapure polymer cryogel. In other embodiments, the dried ultrapure polymer gel is an ultrapure polymer xerogel or an ultrapure polymer aerogel. In some embodiments, the ultrapure polymer gels are prepared from phenolic compounds and aldehyde compounds, for example, in one embodiment, the ultrapure polymer gels can be produced from resorcinol and formaldehyde. In other embodiments, the ultrapure polymer gels are produced under acidic conditions. In some embodiments, acidity can be provided by dissolution of a solid acid compound, by employing an acid as the reaction solvent or by employing a mixed solvent system where one of the solvents is an acid. Preparation of the ultrapure polymer gels is described in more detail below.

The disclosed process comprises polymerization to form a polymer gel in the presence of a basic volatile catalyst. Accordingly, in some embodiments, the ultrapure polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides an ultrapure polymer gel comprising ammonium carbonate, ammonium bicarbonate, ammonium acetate, ammonium hydroxide, or combinations thereof. In further embodiments, the ultrapure polymer gel comprises ammonium carbonate. In other further embodiments, the ultrapure polymer gel comprises ammonium acetate.

In one embodiment of any of the aspects or variations described herein the ultrapure polymer gel is essentially free of t-butanol. For example, in one embodiment, the ultrapure polymer gel contains less than 1000 ppm t-butanol, less than 100 ppm t-butanol, less than 10 ppm t-butanol, or less than 1 ppm t-butanol.

In another embodiment of any of the aspects or variations described herein the ultrapure polymer gel is essentially free of acetone. For example, in one embodiment, the ultrapure polymer gel contains less than 1000 ppm acetone, less than 100 ppm acetone, less than 10 ppm acetone, or less than 1 ppm acetone.

The ultrapure polymer gels comprise low levels of impurities. Thus, in some embodiments, the ultrapure polymer gel comprises carbon, hydrogen and oxygen and a total PIXE impurity content of 1000 ppm or less. In other embodiments, the total PIXE impurity content of the ultrapure polymer gel is less than 1000 ppm, less than 800 ppm, less than 500 ppm, less than 300 ppm, less than 200 ppm, less than 100 ppm, less than 50 ppm, less than 25 ppm, less than 10 ppm, less than 5 ppm or less than 1 ppm.

The ultrapure polymer gels may also comprise low ash content which may contribute to the low ash content of an ultrapure carbon material prepared therefrom. Thus, in some embodiments, the ash content of the ultrapure polymer gel ranges from 0.1% to 0.001%. In other embodiments, the ash content of the ultrapure polymer gel is less than 0.1%, less than 0.08%, less than 0.05%, less than 0.03%, less than 0.025%, less than 0.01%, less than 0.0075%, less than 0.005% or less than 0.001%.

In other embodiments, the ultrapure polymer gel has a total PIXE impurity content of less than 500 ppm and an ash content of less than 0.08%. In a further embodiment, the ultrapure polymer gel has a total PIXE impurity content of less than 300 ppm and an ash content of less than 0.05%. In another further embodiment, the ultrapure polymer gel has a total PIXE impurity content of less than 200 ppm and an ash content of less than 0.02%. In another further embodiment, the ultrapure polymer gel has a total PIXE impurity content of less than 200 ppm and an ash content of less than 0.01%.

As noted above, polymer gels comprising impurities generally yield carbon materials which also comprise impurities. Accordingly, one aspect of the present disclosure is an ultrapure polymer gel with low residual impurities. The amount of individual PIXE impurities present in the ultrapure polymer gel can be determined by proton induced x-ray emission. In some embodiments, the level of sodium present in the ultrapure polymer gel is less than 1000 ppm, less than 500 ppm, less than 100 ppm, less than 50 ppm, less than 10 ppm, or less than 1 ppm. In some embodiments, the level of magnesium present in the ultrapure polymer gel is less than 1000 ppm, less than 100 ppm, less than 50 ppm, less than 10 ppm, or less than 1 ppm. In some embodiments, the level of aluminum present in the ultrapure polymer gel is less than 1000 ppm, less than 100 ppm, less than 50 ppm, less than 10 ppm, or less than 1 ppm. In some embodiments, the level of silicon present in the ultrapure polymer gel is less than 500 ppm, less than 300 ppm, less than 100 ppm, less than 50 ppm, less than 20 ppm, less than 10 ppm or less than 1 ppm. In some embodiments, the level of phosphorous present in the ultrapure polymer gel is less than 1000 ppm, less than 100 ppm, less than 50 ppm, less than 10 ppm, or less than 1 ppm. In some embodiments, the level of sulfur present in the ultrapure polymer gel is less than 1000 ppm, less than 100 ppm, less than 50 ppm, less than 30 ppm, less than 10 ppm, less than 5 ppm or less than 1 ppm. In some embodiments, the level of chlorine present in the ultrapure polymer gel is less than 1000 ppm, less than 100 ppm, less than 50 ppm, less than 10 ppm, or less than 1 ppm. In some embodiments, the level of potassium present in the ultrapure polymer gel is less than 1000 ppm, less than 100 ppm, less than 50 ppm, less than 10 ppm, or less than 1 ppm. In other embodiments, the level of calcium present in the ultrapure polymer gel is less than 100 ppm, less than 50 ppm, less than 20 ppm, less than 10 ppm, less than 5 ppm or less than 1 ppm. In some embodiments, the level of chromium present in the ultrapure polymer gel is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the ultrapure polymer gel is less than 50 ppm, less than 20 ppm, less than 10 ppm, less than 5 ppm, less than 4 ppm, less than 3 ppm, less than 2 ppm or less than 1 ppm. In other embodiments, the level of nickel present in the ultrapure polymer gel is less than 20 ppm, less than 10 ppm, less than 5 ppm, less than 4 ppm, less than 3 ppm, less than 2 ppm or less than 1 ppm. In some other embodiments, the level of copper present in the ultrapure polymer gel is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the ultrapure polymer gel is less than 20 ppm, less than 10 ppm, less than 5 ppm, less than 2 ppm or less than 1 ppm. In yet other embodiments, the sum of all PIXE impurities, excluding sodium, magnesium, aluminum, silicon, phosphorous, sulphur, chlorine, potassium, calcium, chromium, iron, nickel, copper and zinc, present in the ultrapure polymer gel is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the ultrapure polymer gels comprise PIXE impurities near or below the detection limit of the proton induced x-ray emission analysis. For example, in some embodiments, the ultrapure polymer gels comprise less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the ultrapure polymer gel comprises less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the ultrapure polymer gel comprises less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the ultrapure polymer gel comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the ultrapure polymer gel comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields an ultrapure polymer gel comprising a high specific surface area. Without being bound by theory, it is believed that the surface area of the ultrapure polymer gel contributes, at least in part, to the desirable surface area properties of the ultrapure synthetic amorphous carbon materials. The surface area can be measured using the BET technique well-known to those of skill in the art. In one embodiment of any of the aspects disclosed herein the ultrapure polymer gel has a BET specific surface area of at least 150 m$^2$/g, at least 250 m$^2$/g, at least 400 m$^2$/g, at least 500 m$^2$/g, at least 600 m$^2$/g or at least 700 m$^2$/g.

In one embodiment, the ultrapure polymer gel has a BET specific surface area of 100 m$^2$/g to 1000 m$^2$/g. Alternatively, the ultrapure polymer gel has a BET specific surface area of between 150 m$^2$/g and 700 m$^2$/g. Alternatively, the ultrapure polymer gel has a BET specific surface area of between 400 m$^2$/g and 700 m$^2$/g.

In one embodiment, the ultrapure polymer gel has a tap density of from 0.10 g/cc to 0.60 g/cc. In one embodiment, the ultrapure polymer gel has a tap density of from 0.15 g/cc to 0.25 g/cc. In one embodiment of the present disclosure, the ultrapure polymer gel has a BET specific surface area of at least 150 m$^2$/g and a tap density of less than 0.60 g/cc. Alternately, the ultrapure polymer gel has a BET specific surface area of at least 250 m$^2$/g and a tap density of less than 0.4 g/cc. In another embodiment, the ultrapure polymer gel has a BET specific surface area of at least 500 m$^2$/g and a tap density of less than 0.30 g/cc.

In another embodiment of any of the aspects or variations disclosed herein the ultrapure polymer gel comprises a residual water content of less than 15%, less than 13%, less than 10%, less than 5% or less than 1%.

In one embodiment, the ultrapure polymer gel has a fractional pore volume of pores at or below 100 nm that comprises at least 50% of the total pore volume, at least 75% of the total pore volume, at least 90% of the total pore volume or at least 99% of the total pore volume. In another embodiment, the ultrapure polymer gel has a fractional pore volume of pores at or below 20 nm that comprises at least 50% of the total pore volume, at least 75% of the total pore volume, at least 90% of the total pore volume or at least 99% of the total pore volume.

In one embodiment, the ultrapure polymer gel has a fractional pore surface area of pores at or below 100 nm that comprises at least 50% of the total pore surface area, at least 75% of the total pore surface area, at least 90% of the total pore surface area or at least 99% of the total pore surface area. In another embodiment, the ultrapure polymer gel has a fractional pore surface area of pores at or below 20 nm that comprises at least 50% of the total pore surface area, at least 75% of the total pore surface area, at least 90% of the total pore surface or at least 99% of the total pore surface area.

The ultrapure polymer gels can be prepared by the polymerization of one or more polymer precursors in an appropriate solvent system under catalytic conditions. Accordingly, in one embodiment the ultrapure polymer gel is prepared by admixing one or more miscible solvents, one or more phenolic compounds, one or more aldehydes and one or more catalysts. For example in a further embodiment the ultrapure polymer gel is prepared by admixing water, acetic acid, resorcinol, formaldehyde and ammonium acetate. Preparation of ultrapure polymers gels is discussed in more detail below.

2. Ultrapure Synthetic Carbon Materials

As noted above, this invention is a directed to a synthetic carbon material which is ultrapure (i.e. less than 500 ppm of total PIXE impurities). In some embodiments, the synthetic ultrapure carbon material is amorphous. While not wishing to be bound by theory, it is believed that the purity and properties of the carbon materials are a function of its preparation method, and variation of the preparation parameters may yield carbon materials having different properties. Accordingly, in some embodiments, the ultrapure synthetic carbon material or ultrapure synthetic amorphous carbon material is a pyrolyzed dried ultrapure polymer gel, for example, a pyrolyzed ultrapure polymer cryogel, a pyrolyzed ultrapure polymer xerogel or a pyrolyzed ultrapure polymer aerogel. In other embodiments, the ultrapure synthetic carbon material or ultrapure synthetic amorphous carbon material is activated (i.e., an ultrapure synthetic activated carbon material). For example, in further embodiments the ultrapure synthetic carbon material or ultrapure synthetic amorphous carbon material is an activated dried ultrapure polymer gel, an activated ultrapure polymer cryogel, an activated ultrapure polymer xerogel or an activated ultrapure polymer aerogel.

The ultrapure synthetic carbon material and ultrapure synthetic amorphous carbon material comprise low total PIXE impurities. Thus, in some embodiments the total PIXE impurity content in the ultrapure synthetic carbon material or ultrapure synthetic amorphous carbon material (as measured by proton induced x-ray emission) is less than 1000 ppm. In other embodiments, the total PIXE impurity content in the ultrapure synthetic carbon material or ultrapure synthetic amorphous carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the ultrapure synthetic carbon material or ultrapure synthetic amorphous carbon material is a pyrolyzed dried ultrapure polymer gel, a pyrolyzed ultrapure polymer cryogel, a pyrolyzed ultrapure polymer xerogel, a pyrolyzed ultrapure polymer aerogel, an activated dried ultrapure polymer gel, an activated ultrapure polymer cryogel, an activated ultrapure polymer xerogel or an activated ultrapure polymer aerogel.

In addition to low PIXE impurity content, the disclosed carbon materials comprise high total carbon content. In addition to carbon, the ultrapure synthetic carbon material and ultrapure synthetic amorphous carbon material may also comprise oxygen, hydrogen and nitrogen. In some embodiments, the ultrapure synthetic carbon material or ultrapure synthetic amorphous carbon material comprises at least 85% carbon, at least 90% carbon, at least 95% carbon, at least 96% carbon, at least 97% carbon, at least 98% carbon or at least 99% carbon on a weight/weight basis. In some other embodiments, the ultrapure synthetic carbon material or ultrapure synthetic amorphous carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the ultrapure synthetic carbon material or ultrapure synthetic amorphous carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the ultrapure synthetic carbon material or ultrapure synthetic amorphous carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of a carbon material may, in some instances, have an effect on the electrochemical performance of a carbon material. Accordingly, in some embodiments, the ash content of the ultrapure synthetic carbon material or ultrapure synthetic amorphous carbon material ranges from 0.1% to 0.001%, for example in some specific embodiments the ash content of the ultrapure synthetic carbon material or ultrapure synthetic amorphous carbon material is less than 0.1%, less than 0.08%, less than 0.05%, less than 0.03%, than 0.025%, less than 0.01%, less than 0.0075%, less than 0.005% or less than 0.001%.

In other embodiments, the ultrapure synthetic carbon material or ultrapure synthetic amorphous carbon material has a total PIXE impurity content of less than 500 ppm and an ash content of less than 0.08%. In further embodiments, the ultrapure synthetic carbon material or ultrapure synthetic amorphous carbon material has a total PIXE impurity content of less than 300 ppm and an ash content of less than 0.05%. In other further embodiments, the ultrapure synthetic carbon material or ultrapure synthetic amorphous carbon material has a total PIXE impurity content of less than 200 ppm and an ash content of less than 0.05%. In other further embodiments, the ultrapure synthetic carbon material or ultrapure synthetic amorphous carbon material has a total PIXE impurity content of less than 200 ppm and an ash content of less than 0.025%. In other further embodiments, the ultrapure synthetic carbon material or ultrapure synthetic amorphous carbon material has a total PIXE impurity content of less than 100 ppm and an ash content of less than 0.02%. In other further embodiments, the ultrapure synthetic carbon material or ultrapure synthetic amorphous carbon material has a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the ultrapure synthetic carbon material or ultrapure synthetic amorphous carbon material is less than 1000 ppm, less than 500 ppm, less than 100 ppm, less than 50 ppm, less than 10 ppm, or less than 1 ppm. In some embodiments, the level of magnesium present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of aluminum present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of silicon present in the ultrapure synthetic carbon material or ultrapure synthetic amorphous carbon material is less than 500 ppm, less than 300 ppm, less than 100 ppm, less than 50 ppm, less than 20 ppm, less than 10 ppm or less than 1 ppm. In some embodiments, the level of phosphorous present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of sulfur present in the ultrapure synthetic carbon material or ultrapure synthetic amorphous carbon material is less than 1000 ppm, less than 100 ppm, less than 50 ppm, less than 30 ppm, less than 10 ppm, less than 5 ppm or less than 1 ppm. In some embodiments, the level of chlorine present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of potassium present in the ultrapure synthetic carbon material or ultrapure synthetic amorphous carbon material is less than 1000 ppm, less than 100 ppm, less than 50 ppm, less than 10 ppm, or less than 1 ppm. In other embodiments, the level of calcium present in the ultrapure synthetic carbon material or ultrapure synthetic amorphous carbon material is less than 100 ppm, less than 50 ppm, less than 20 ppm, less than 10 ppm, less than 5 ppm or less than 1 ppm. In some embodiments, the level of chromium present in the ultrapure synthetic carbon material or ultrapure synthetic amorphous carbon material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the ultrapure synthetic carbon material or ultrapure synthetic amorphous carbon material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the ultrapure synthetic carbon material or ultrapure synthetic amorphous carbon material is less than 20 ppm, less than 10 ppm, less than 5 ppm, less than 4 ppm, less than 3 ppm, less than 2 ppm or less than 1 ppm. In some other embodiments, the level of copper present in the ultrapure synthetic carbon material or ultrapure synthetic amorphous carbon material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the ultrapure synthetic carbon material or ultrapure synthetic amorphous carbon material is less than 20 ppm, less than 10 ppm, less than 5 ppm, less than 2 ppm or less than 1 ppm. In yet other embodiments, the sum of all PIXE impurities, excluding sodium, magnesium, aluminum, silicon, phosphorous, sulphur, chlorine, potassium, calcium, chromium, iron, nickel, copper and zinc, present in the ultrapure synthetic carbon material or ultrapure synthetic amorphous carbon material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the ultrapure synthetic carbon material or ultrapure synthetic amorphous carbon material comprises PIXE impurities near or below the detection limit of the proton induced x-ray emission analysis. For example, in some embodiments the ultrapure synthetic carbon material or ultrapure synthetic amorphous carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the ultrapure synthetic carbon material or ultrapure synthetic amorphous carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the ultrapure synthetic carbon material or ultrapure synthetic amorphous carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the ultrapure synthetic carbon material or ultrapure synthetic amorphous carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the ultrapure synthetic carbon material or ultrapure synthetic amorphous carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials comprise a high surface area. While not wishing to be bound by theory, it is thought that such high surface area may contribute to the high energy density obtained from devices comprising the ultrapure synthetic carbon material or ultrapure synthetic amorphous carbon material. Accordingly, in some embodiment, the ultrapure synthetic carbon material or ultrapure synthetic amorphous carbon material comprises a BET specific surface area of at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. For example, in some embodiments of the foregoing, the ultrapure synthetic carbon material or ultrapure synthetic amorphous carbon material is activated.

In another embodiment, the ultrapure synthetic carbon material or ultrapure synthetic amorphous carbon material has a tap density between 0.2 and 0.6 g/cc, between 0.3 and 0.5 g/cc or between 0.4 and 0.5 g/cc. In another embodiment, the ultrapure synthetic carbon material or ultrapure synthetic amorphous carbon material has a total pore volume of at least 0.5 cm$^3$/g, at least 0.7 cm$^3$/g, at least 0.75 cm$^3$/g, at least 0.9 cm³/g, at least 1.0 cm³/g, at least 1.1 cm³/g, at least 1.2 cm³/g, at least 1.3 cm³/g, at least 1.4 cm³/g, at least 1.5 cm³/g or at least 1.6 cm³/g.

The pore size distribution of the disclosed carbon materials is one parameter that may have an effect on the electrochemical performance of the synthetic amorphous carbon materials. For example, a carbon material comprising pores sized to accommodate specific electrolyte ions may be particularly useful in EDLC devices. In addition, carbon materials comprising mesopores with a short effective length (i.e., less than 10 nm, less than 5, nm or less than 3 nm as measured by TEM) may be useful to enhance ion transport and maximize power. Accordingly, in one embodiment, the ultrapure synthetic carbon material or ultrapure synthetic amorphous carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the ultrapure synthetic carbon material or ultrapure synthetic amorphous carbon material comprises a fractional pore volume of pores at or below 20 nm that comprises at least 50% of the total pore volume, at least 75% of the total pore volume, at least 90% of the total pore volume or at least 99% of the total pore volume.

In another embodiment, the ultrapure synthetic carbon material or ultrapure synthetic amorphous carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the ultrapure synthetic carbon material or ultrapure synthetic amorphous carbon material comprises a fractional pore surface area of pores at or below 20 nm that comprises at least 50% of the total pore surface area, at least 75% of the total pore surface area, at least 90% of the total pore surface area or at least 99% of the total pore surface area.

In another embodiment of the present disclosure, the ultrapure synthetic carbon material or ultrapure synthetic amorphous carbon material is prepared by a method disclosed herein, for example, in some embodiments the ultrapure synthetic carbon material or ultrapure synthetic amorphous carbon material is prepared by a method comprising pyrolyzing a dried ultrapure polymer gel as disclosed herein. In some embodiments, the pyrolyzed ultrapure polymer gel is further activated to obtain an ultrapure synthetic activated carbon material or an ultrapure synthetic amorphous carbon material. Methods for preparation of the disclosed carbon materials are described in more detail below.

B. Preparation of Ultrapure Synthetic Amorphous Carbon Materials

In one embodiment, a method for preparing novel ultrapure polymer gels is provided. In another embodiment, a method for preparing ultrapure synthetic carbon materials is provided, for example, in some embodiments, the ultrapure synthetic carbon material is an ultrapure synthetic amorphous carbon material. Such ultrapure polymer gels and ultrapure synthetic carbon materials cannot be obtained by previously reported methods. In some further embodiments, a method for preparing ultrapure synthetic activated carbon materials, for example ultrapure synthetic amorphous activated carbon materials, is provided. Details of the variable process parameters of the various embodiments of the disclosed methods are described below.

1. Preparation of Ultrapure Polymer Gels

The ultrapure polymer gels may be prepared by a sol gel process. For example, the ultrapure polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In one embodiment, of the method the phenolic compound is resorcinol, catechol, hydroquinone, phloroglucinol, phenol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde.

The sol gel polymerization process is generally performed under catalytic conditions. Accordingly, in some embodiments, preparing the ultrapure polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the ultrapure polymer gel as well as the final properties of the ultrapure synthetic carbon materials, for example, ultrapure synthetic amorphous carbon materials, prepared therefrom. Thus, in some embodiments such catalysts are used in the range of molar ratios of 10:1 to 2000:1 phenolic compound:catalyst. In some embodiments, such catalysts can be used in the range of molar ratios of 20:1 to 200:1 phenolic compound:catalyst. For example in other embodiments, such catalysts can be used in the range of molar ratios of 25:1 to 100:1 phenolic compound:catalyst.

The reaction solvent is another process parameter that may be varied to obtain the desired properties of the ultrapure polymer gels and synthetic amorphous carbon materials. In some embodiments, the solvent for preparation of the ultrapure polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the ultrapure polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method the solvent is a binary solvent comprising acetic acid and water. In further embodiments, the solvent comprises a ratio of acetic acid to water of 99:1, 90:10, 75:25, 50:50, 25:75, 10:90 or 1:90. In other embodiments, acidity is provided by adding a solid acid to the reaction solvent.

Some embodiments of the disclosed method do not comprise a solvent exchange step (e.g., exchange t-butanol for water) prior to lyophilization. For example, in one embodiment of any of the methods described herein, before freezing, the ultrapure polymer gel or ultrapure polymer gel particles are rinsed with water. In one embodiment, the average diameter of said ultrapure polymer gel particles prior to freezing is less than 25 mm, for example, between 0.001 mm and 25 mm; alternately, the average diameter of said ultrapure polymer gel particles prior to freezing is between 0.01 mm and 15 mm, for example, between 1.0 mm and 15 mm. In some examples, the ultrapure polymer gel particles are between 1 mm and 10 mm. In further embodiments, the ultrapure polymer gel particles are frozen via immersion in a medium having a temperature of below about −10° C., for example, below about −20° C., or alternatively below about −30° C. For example, the medium may be liquid nitrogen or ethanol (or other organic solvent) in dry ice or ethanol cooled by another means. In some embodiments, drying under vacuum comprises subjecting the frozen particles to a vacuum pressure of below about 1400 mTorr.

Other methods of rapidly freezing the ultrapure polymer gel particles are also envisioned. In another embodiment, the ultrapure polymer gel is rapidly frozen by co-mingling or physical mixing of ultrapure polymer gel particles with a suitable cold solid, for example, dry ice (solid carbon dioxide). Another method is to use a blast freezer with a metal plate at −60° C. to rapidly remove heat from the ultrapure polymer gel particles scattered over its surface. A third method of rapidly cooling water in a ultrapure polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a ultrapure polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen.

In other embodiments, the ultrapure polymer gel particles are frozen on a lyophilizer shelf at a temperature of −20° C. or lower. For example, in some embodiments the ultrapure polymer gel particles are frozen on the lyophilizer shelf at a temperature of −30° C. or lower. In some other embodiments, the ultrapure polymer gel monolith is subjected to a freeze thaw cycle (from room temperature to −20° C. or lower and back to room temperature), physical disruption of the freeze-thawed gel to create particles, and then further lyophilization processing. For example, in some embodiments, the ultrapure polymer gel monolith is subjected to a freeze thaw cycle (from room temperature to −30° C. or lower and back to room temperature), physical disruption of the freeze-thawed gel to create particles, and then further lyophilization processing.

In some embodiments of the methods described herein, the molar ratio of phenolic precursor to catalyst is from about 10:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 50:1.

In the specific embodiment wherein one of the polymer precursors is resorcinol and another polymer precursor is formaldehyde, the resorcinol to catalyst ratio can be varied to obtain the desired properties of the resultant ultrapure polymer gel and synthetic amorphous carbon materials. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 50:1.

Polymerization to form an ultrapure polymer gel can be accomplished by various means described in the art. For instance, polymerization can be accomplished by incubating suitable polymer precursor materials in the presence of a suitable catalyst for a period of time. The time for polymerization can be a period ranging from minutes or hours to days, depending on temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone(methyl vinyl ketone) and the like; branched saturated and unsaturated ketones; and aromatic-type ketones such as methyl benzyl ketone (phenylacetone), ethyl benzyl ketone, and the like. The ultrapure polymer precursor materials can also be combinations of the precursors described above.

In some embodiments, one polymer precursor is an alcohol-containing species and another polymer precursor is a carbonyl-containing species. The relative amounts of alcohol-containing species (e.g. alcohols, phenolic compounds and mono- or poly-hydroxy compounds or combinations thereof) reacted with the carbonyl containing species (e.g.

aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The total solids content in the aqueous solution prior to ultrapure polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the ultrapure polymer gels disclosed herein include but are not limited to water or alcohol such as, for example, ethanol, t butanol, methanol or mixtures of these, optionally further with water. Such solvents are useful for dissolution of the polymer precursor materials, for example dissolution of the phenolic compound. In addition, in some processes such solvents are employed for solvent exchange in the ultrapure polymer gel (prior to freezing and drying), wherein the solvent from the ultrapure polymerization of the precursors, for example, resorcinol and formaldehyde, is exchanged for a pure alcohol. In one embodiment of the present application, an ultrapure polymer gel is prepared by a process that does not include solvent exchange.

Suitable catalysts in the preparation of ultrapure polymer gels include volatile basic catalysts that facilitate polymerization of the precursor materials into a monolithic ultrapure polymer. The catalyst can also comprise various combinations of the catalysts described above. In embodiments comprising phenolic compounds, such catalysts can be used in the range of molar ratios of 20:1 to 200:1 phenolic compound: catalyst. For example, in some specific embodiments such catalysts can be used in the range of molar ratios of 25:1 to 100:1 phenolic compound:catalyst.

2. Creation of Ultrapure Polymer Gel Particles

A monolithic ultrapure polymer gel can be physically disrupted to create smaller particles according to various techniques known in the art. The resultant ultrapure polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the ultrapure polymer gel particles can be in the range below about 1 mm, for example, in the size range of about 10 to 1000 microns. Techniques for creating ultrapure polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The ultrapure polymer gels are generally very brittle for a 'wet' material and are not damp to the touch. Consequently they are easily milled using this approach, however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $1/8^{th}$ inch. In another embodiment, the rotary crusher has a screen mesh size of about $3/8^{th}$ inch. In another embodiment, the rotary crusher has a screen mesh size of about $5/8^{th}$ inch. In another embodiment, the rotary crusher has a screen mesh size of about $3/8^{th}$ inch.

Milling can be accomplished at room temperature according to methods well known to those of skill in the art. Alternatively, milling can be accomplished cryogenically, for example by co-milling the ultrapure polymer gel with solid carbon dioxide (dry ice) particles. In this embodiment, the two steps of (a) creating particles from the monolithic ultrapure polymer gel and (b) rapid, multidirectional freezing of the ultrapure polymer gel are accomplished in a single process.

3. Rapid Freezing of Ultrapure Polymer Gels

After the ultrapure polymer gel particles are formed from the monolithic ultrapure polymer gel, freezing of the ultrapure polymer gel particles is accomplished rapidly and in a multi-directional fashion as described in more detail above. Freezing slowly and in a unidirectional fashion, for example by shelf freezing in a lyophilizer, results in dried material having a very low surface area as evidenced in an example herein. Similarly, snap freezing (i.e., freezing that is accomplished by rapidly cooling the ultrapure polymer gel particles by pulling a deep vacuum) also results in a dried material having a low surface area. As disclosed herein rapid freezing in a multidirectional fashion can be accomplished by rapidly lowering the material temperature to at least about $-10°$ C. or lower, for example, $-20°$ C. or lower, or for example, to at least about $-30°$ C. or lower. Rapid freezing of the ultrapure polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transtion from liquid to solid without further component concentration nor product cooling until complete freezing is achieved. In the specific case of water and acetic acid (which as pure substances exhibit freezing points of $0°$ C. and $17°$ C., respectively), the eutectic composition is comprised of approximately 59% acetic acid and 41% water and freezes at about $-27°$ C. Accordingly, in one embodiment, the mixed solvent system is the eutectic composition, for example, in one embodiment the mixed solvent system comprises 59% acetic acid and 41% water.

4. Drying of Ultrapure Polymer Gels

In one embodiment, the frozen ultrapure polymer gel particles containing a fine ice matrix are lyophilized under conditions designed to avoid collapse of the material and to maintain fine surface structure and porosity in the dried product. Details of the conditions of the lyophilization are provided herein. Generally drying is accomplished under conditions where the temperature of the product is kept below a temperature that would otherwise result in collapse of the product pores, thereby enabling the dried material to retain an extremely high surface area.

One benefit of having an extremely high surface area in the dried product is the improved utility of the ultrapure polymer gel for the purpose of fabrication of capacitors, energy storage devices, and other energy-related applications. Different ultrapure polymer gel applications require variations in the pore size distribution such as different levels of micropore volume, mesopore volume, surface area, and pore size. By tuning the various processing parameters of the ultrapure polymer gel, high pore volumes can be reached at many different pore sizes depending on the desired application.

The structure of the final carbon material is reflected in the structure of the ultrapure dried polymer gel which in turn is established by the ultrapure polymer gel properties. These features can be created in the ultrapure polymer gel using a sol-gel processing approach as described herein, but if care is not taken in removal of the solvent, then the structure is not preserved. It is of interest to both retain the original structure of the ultrapure polymer gel and modify its structure with ice crystal formation based on control of the freezing process. In some embodiments, prior to drying the aqueous content of the ultrapure polymer gel is in the range of about 50% to about 99%. In certain embodiments, upon drying the aqueous content of the ultrapure polymer cryogel is than about 10%, alternately less than about 5% or less than about 2.5%.

Differential scanning calorimetry (DSC) data for an ultrapure polymer hydrogel demonstrates a large exothermic event at $\sim-18°$ C. These data are consistent with freezing of water inside a pore of ~4 nm radius. These findings indicate that the extremely rapid freezing for the purposes of the current application not only constitutes a rapid freezing rate, but also that the extent of the decrease is such that the material is brought below at least $-18°$ C.

The DSC data also demonstrate that upon warming, there is a broad, complex endothermic behavior, with the onset about $-13°$ C. and a midpoint of about $-10°$ C. There appears to be a thermal transition at about $-2°$ C., and final melting at about $+1°$ C. The various events may correspond to melting of different types of microstructures. The data suggest that in order to avoid loss of fine product structure in the frozen state, product temperature during initial (e.g., primary) drying should be maintained below $-13°$ C. This is accomplished, for example, in a drying step where heat transfer during primary drying is dominated by convection rather than conduction, thus the product temperature during sublimation will correspond to the temperature of ice at equilibrium with the chamber pressure.

A lyophilizer chamber pressure of about 2250 microns results in a primary drying temperature in the drying product of about $-10°$ C. Drying at about 2250 micron chamber pressure or lower case provides a product temperature during primary drying that is no greater than about $-10°$ C. As a further illustration, a chamber pressure of about 1500 microns results in a primary drying temperature in the drying product of about $-15°$ C. Drying at about 1500 micron chamber pressure or lower provides a product temperature during primary drying that is no greater than about $-15°$ C. As yet a further illustration, a chamber pressure of about 750 microns results in a primary drying temperature in the drying product of about $-20°$ C. Drying at 750 micron chamber pressure or lower provides a product temperature during primary drying that is no greater than about $-20°$ C. As yet a further illustration, a chamber pressure of about 300 microns results in a primary drying temperature in the drying product of about $-30°$ C. Drying at 300 micron chamber pressure or lower provides a product temperature during primary drying that is no greater than about $-30°$ C.

5. Pyrolysis and Activation of Ultrapure Polymer Gels

In another embodiment, a method for making an ultrapure synthetic activated carbon material, for example an ultrapure synthetic activated amorphous carbon material, is provided comprising pyrolysis and activation of a dried polymer gel disclosed herein. In some embodiments of the present disclosure, an ultrapure synthetic activated carbon material or ultrapure synthetic activated amorphous carbon material having a specific surface area of at least 1000 $m^2/g$, at least 1500 $m^2/g$, at least 2000 $m^2/g$, at least 2400 $m^2/g$, at least 2500 $m^2/g$ or at least 3000 $m^2/g$ is provided.

Generally, in the pyrolysis process, dried ultrapure polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 800° C. to about 900° C.

In some embodiments, the pyrolysis dwell temperature is varied during the course of pyrolysis. In one embodiment, the pyrolysis is carried out in a rotary kiln with separate distinct heating zones, the temperature for each zone is sequentially decreased from the entrance to the exit end of the rotary kiln tube. In one embodiment, the pyrolysis is carried out in a rotary kiln with separate distinct heating zones, the temperature for each zone is sequentially increased from entrance to exit end of the rotary kiln tube. In one embodiment, the entrance end of the heating zone is set at 690° C., the middle of the heating zone is set at 750° C. and the exit end of the heating zone is set at 850° C.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed ultrapure polymer gels may be activated by contacting the pyrolyzed ultrapure polymer gel with an activating agent. Many gases are suitable for activating, for example gases which contain oxygen. Non-limiting examples of activating gases include carbon dioxide, carbon monoxide, steam, and oxygen. Activating agents may also include corrosive chemicals such as acids, bases or salts (e.g., phosphoric acid, potassium hydroxide, sodium hydroxide, zinc chloride, etc.). Other activating agents are known to those skilled in the art.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours.

Generally, in the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

The degree of activation is measured in terms of the mass percent of the pyrolyzed dried ultrapure polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

In the methods disclosed herein for the production of high surface area ultrapure synthetic activated carbon materials, the ultrapure polymer gel is engineered to produce a material which is already highly porous and contains within its ultrapure polymer framework a carbonic structure which, when pyrolyzed and activated, will produce an activated carbon material that contains a targeted mix of mesopores and micropores. By producing ultrapure polymer gel with the appropriate targeted mix of meso- and micro-pores, the amount of required activation is reduced, thereby improving yield and reducing cost. Also, the ability to tune the properties (e.g. pore size) of the intermediates introduces a degree of tunability that has not been realized by a more traditional approach of pyrolyzing and over-activating existing carbon material. For example, manipulating the processing variables of the intermediates as described herein has a more important impact on the final carbon nanostructure than the traditional methods of adjusting pyrolysis and activation variables.

The ability to scale up a manufacturing approach as disclosed herein to meet the high demand expected for the activated carbon materials disclosed herein has been demonstrated. Three parts of the process can be identified: 1) ultrapure polymerization from precursor ultrapure polymer materials; 2) freeze drying; and 3) pyrolysis/activation. In one embodiment, each of these steps may be scaled employing standard manufacturing equipment of three existing industries, for example, specialty chemical companies working with adhesives and epoxies; pharmaceutical and food related freeze drying providers; and manufactures of low grade activated carbon, respectively.

It has been shown that the amount of catalyst and percentage of water in the initial sol has a significant impact on the final performance of the activated carbon material (e.g. when used in a supercapacitor). The large number of process variables and the interaction between these variables enables continuous refinement of the process and allows for some control over the final carbon structure. Accordingly, in one embodiment, the present disclosure provides refinement of the process variables. The disclosed refinements result in an ability to exert control over the final carbon structure in a manner that was previously unobtainable.

The most common approach to refining process variables used in the art is to hold all but one variable constant and determine the effect of varying that one parameter. Alternately, and as described herein, the combination of statistical analysis methods, DFE Pro Software, and a factorial design of experiments approach, were used to systematically vary multiple parameters simultaneously to obtain an optimized process for preparing activated carbon material. By using this approach, the impact of each of these variables on a range of different metrics (e.g. surface area, density, pore volume, etc.) related to the activated carbon material's structure are evaluated. When the ultrapure synthetic activated carbon material is employed in a supercapacitor, additional performance metrics may be evaluated. For example, capacitance, density and power density may be evaluated.

C. Characterization of Ultrapure Polymer Gels and Ultrapure Synthetic Carbon Materials The structural properties of the final ultrapure synthetic activated carbon material, ultrapure synthetic activated amorphous carbon material, \dried polymer gels, and the pyrolyzed, but unactivated ultrapure polymer gels may be measured using Nitrogen sorption at 17K, a method known to those of skill in the art. The final performance and characteristics of the finished ultrapure synthetic activated carbon material is important, but the intermediate products (both dried ultrapure polymer gel and pyrolyzed, but not activated, ultrapure polymer gel), can also be evaluated, particularly from a quality control standpoint, as known to those of skill in the art. The Micromeretics ASAP 2020 is used to perform detailed micropore and mesopore analysis, which reveals the pore size distribution from 0.35 nm to 50 nm. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

In some embodiments, the pyrolyzed ultrapure polymer gels have a surface area from about 100 to about 1200 m²/g. In other embodiments, the pyrolyzed ultrapure polymer gels have a surface area from about 500 to about 800 m²/g. In other embodiments, the pyrolyzed ultrapure polymer gels have a surface area from about 500 to about 600 m²/g.

In some embodiments, the pyrolyzed ultrapure polymer gels have a tap density from about 0.1 to about 1.0 cc/g. In other embodiments, the pyrolyzed ultrapure polymer gels have a tap density from about 0.3 to about 0.6 cc/g. In other embodiments, the pyrolyzed ultrapure polymer gels have a tap density from about 0.35 to about 0.45 cc/g.

D. Tuning the Pore Size and Other Properties of Ultrapure Polymer Gels

The disclosed ultrapure carbon materials synthesized from synthetic, well-characterized precursors are different from activated carbon from natural sources such as coal, pitch, coconuts, etc. This is due in part to the fact that they can be tuned in both micropore and mesopore structure and chemistry by carefully predesigned and executed processing controls. Additionally, an ultrapure carbon material as described herein can contain a porous structure which can be optimized for a given application (e.g. when used in a supercapacitor or other energy storage device). With the ability to tune the carbon nanostructure, performance exceeding current performance data from traditional activated carbons is attained. Important variables include large accessible surface area, short micropores for electrolytic salt diffusion, and minimization of wasted pore volume to enhance specific capacitance.

Manipulation of the process variables allows production of ultrapure synthetic activated carbon materials that have properties which suit the desired application. Accordingly, in one embodiment a method of optimizing the process variables for production of ultrapure polymer gels, dried ultrapure polymer gels, pyrolyzed ultrapure polymer gels and ultrapure synthetic activated carbon materials is provided. One approach for optimization of process parameters comprises a design of experiments strategy. Using this strategy, the influence of multiple process variables (e.g. up to 8 variables) can be studied with relatively few experiments. The data obtained from the design of experiments can be used to manipulate process variables to obtain specific properties in the ultrapure polymer gels, dried ultrapure polymer gels, pyrolyzed ultrapure polymer gels, and activated ultrapure polymer cryogels. For example, in some embodiments, the process parameters which are manipulated to obtain the desired product characteristics are selected from: Resorcinol/Catalyst Ratio, Resorcinol/Water Ratio, Particle Size at Freezing Step, Quench Temperature, Pyrolysis Time, Pyrolysis Temperature, Activation Temperature, and Activation Time and combinations thereof.

In some embodiments, a set of electrochemical test cells are utilized with a tetramethylammonium (TMA) cation. Whereas the tetraethylammonium (TEA) ion is 0.69 nm in diameter, the tetramethylammonium ion is only 0.57 nm in diameter. Each cation is paired with a tetrafluoroborate (TFB) anion which is 0.46 nm in diameter. The sizes of these various ions shed some light on the pore size ranges described above. As long as micropores are short and not tortuous, they admit ions smaller than the pore diameter. One way that capacitance and energy density are increased is by allowing ions into as many pores as possible in the carbon network. For example, pores smaller than 0.5 nm admit the TFB anion, but neither of the TEA or TMA cations. Pores between 0.5 nm and 0.65 nm admit TMA cations but not TEA and pores larger than 0.65 nm will admit TEA ions. This concept summarizes the ion sieving theory, where the carbon material is considered a sieve that will only allow ions smaller than the pore size. Evaluation of the difference in capacitance and consequently energy density developed on the anodes and cathodes of cells containing TMATFB vs. TEATFB electrolytes provides insight into the importance of pores volume within certain pore size range.

Manipulation of the process variables allows production of ultrapure synthetic activated carbons that have a pore size distribution that suits the chosen electrolyte system. For example a carbon anode may be produced that has a micropore peak at around 0.8 nm, which is centered on a pore size that fits a TEA ion. Based on the output of the DFE Pro Software, process settings are selected based on those variables that are the most statistically significant for pores having pore volume and surface area between 0.7-1.0 nm set as the primary performance metrics. Interaction of variables and multi-variable 'contour maps' are used to extrapolate process settings that lie either in between the settings used above or outside the range specified above. After determining the targeted process variables for meeting the pore size requirement of this task, batch of ultrapure synthetic activated carbon, such as activated carbon cryogels, are produced based using these settings. The anode material is then characterized using the ASAP 2020 and Density Functional Theory for pore size distribution analysis to confirm the existence of a high volume and surface area peak within the prescribed range of 0.7-1.0 nm.

Analogously, a different pore size range, 0.6-0.8 nm, is used as the target for tuning the pore size for TMA cations, while still using the same approach described herein. Still further, the approach can be used to produce carbons that have a pore size distribution, less than 0.6 nm, that corresponds to TFB anions.

Varying the capacitance developed per gram of carbon in the anode and cathode enables production of a charge-balanced cell with a matched capacity for anions and cations. This approach improves the energy density of the overall cell while reducing cost associated with creating pores that are not right sized for the ions of the electrolyte.

In addition, according to the methods disclosed herein, carbons can be mass-produced with a targeted pore size distribution for any number of electrolyte ions. The ranges of pore sizes described herein were chosen for the particular systems studied, however, other ranges can be produced according to the methods disclosed herein. For example, data can be extracted from the ASAP 2020 software generated reports and the DFE Pro Design of experiments can be altered to display the proper tuning parameters for pores of any size. While particular parameters may not have been disclosed herein, the factorial design of experiments approach enables one of skill in the art to make adjustments to generate the targeted peak pore size.

Analysis of these results provides a number of different insights. Studying the ability of an anode or cathode with a known micropore size peak to develop maximum capacitance using a salt ion of known dimensions provides information on the effective size of the ions in play and what pore size sieves out which ions. Use of the pore volume data as well as the capacitance data of the systems disclosed herein provides identification of the minimum pore size needed to develop capacitance with a larger tetraethylammonium cation vs. the smaller tetramethylammonium cation or a tetrafluoroborate anion. One targeted carbon material for use as an electrode is a system where the micropore peak is just above the threshold when pores are too small to allow an ion to electrosorb to the surface of the pore wall, while at the same time minimizing pore volume in other ranges.

The factorial design of experiments approach, when used with pore volume in a specific range as a performance metric, indicates how to adjust the process parameters to maximize pore volume in that pore size range.

When electrolyte ions are free in an unconstrained solvent in the absence of electric field, they are typically surrounded by solvent ions which serve to balance their charge. It is expected that this still takes place to some degree despite the strong electric field and the cramped space inside the pores. Each ion has a different propensity towards keeping itself solvated and hence has a different effective size—larger for strong solvation and smaller for weak solvation. The ion sieving study described above evaluates the degree to which these salts remain solvated and hence what size pores are appropriate.

As mentioned above, one way to maximize the energy density of a nanostructured carbon electrode is to produce pores of the right size for the ions electrosorbed to the surface of that electrode. An activated carbon with a pore size distribution that is ideal for the anion and another that is ideal for the cation are assembled in an asymmetric cell capable of exceeding the capacitance and energy density of symmetric cells used elsewhere.

E. Use of Dried Ultrapure Polymer Gels and Ultrapure Synthetic Carbon Material

The ultrapure synthetic carbon materials, for example, ultrapure synthetic amorphous carbon materials can be used in devices requiring stable, high surface area micro- and mesoporous structure. Examples of applications for the disclosed carbon materials include, but are not limited to: energy storage and distribution devices, ultracapacitor electrodes, pseudocapacitor electrodes, battery electrodes, lead acid battery electrodes, gas diffusion electrodes, including lithium-air electrodes and zinc-air electrodes, lithium ion batteries and capacitors (for example as cathode material), conducting current collectors/scaffolds for other active materials in electrochemical systems, nanostructured material support scaffolds, solid state gas storage (e.g., $H_2$ and $CH_4$ storage), capacitive deionization of salt water, biomedical applications including poison control and controlled drug release, air filtration, water filtration, chemical filtration, catalytic converters, thermal insulation, chromatographic packing, adsorbants and as a carbon-based scaffold support structure for other catalytic functions such as hydrogen storage or fuel cell electrodes.

The disclosed carbon materials may also be employed in kinetic energy harvesting applications such as: hybrid electric vehicles, heavy hybrids, all electric drive vehicles, cranes, forklifts, elevators, electric rail, hybrid locomotives and electric bicycles. The ultrapure synthetic amorphous carbon materials may also be employed in electrical back-up applications such as: UPS, data center bridge power, voltage dip compensation, electric brake actuators, electric door actuators, electronics, telecom tower bridge power. Applications requiring pulse power in which the ultrapure synthetic activated carbons of this disclosure may be useful include, but are not limited to: boardnet stabilization, electronics including cell phones, PDAs, camera flashes, electronic toys, wind turbine blade pitch actuators, power quality/power conditioning/frequency regulation, electric supercharger. Yet other uses of the ultrapure synthetic amorphous carbon materials includes use in automotive starting and stopping systems, power tools, flashlights, personal electronics, self contained solar powered lighting systems, RFID chips and systems, windfield developers for survey device power, sensors, pulse laser systems and phasers.

The disclosed carbon materials may also be used in applications where high purity is critical, for example, applications in the medical, electronic, chemical analysis, mems (micromachines), and biological fields. Chemical and electrochemical sensors or detectors of all kinds would experience less interference from impurities or experience fewer side reactions caused or catalyzed by impurities. Examples are impurities in air (explosives, hazardous chemicals, synthetic noses, or impurities in water such as organics or water impurities in organic liquids.

The acid/base nature of carbon is largely a function of impurities including chemisorbed oxygen. Thus, the ultrapure synthetic amorphous carbon materials are useful in applications where controlling the acid/base nature of the carbon material is desired.

Carbon is used as a reactant in the chemical production of materials and as an electrode in the electrochemical production of materials. Thus, the disclosed carbon materials find utility in the chemical and electrochemical production of high purity materials especially metals. The disclosed carbon material may also be employed as an electrode in zinc-manganese oxide batteries (common flashlight batteries) and zinc-halogen batteries and incorporated into carbon-ultrapure polymer composites for use as electrically conductive adhesives and seals and for minimizing radiation leakage.

The dried ultrapure polymer gels disclosed herein find utility in any number of applications. For example, the dried ultrapure polymer gels are useful as wood adhesives (e.g., for plywood or particle board), bonding textiles and metals to rubber (e.g., rubber tires), filtration media, dielectric insulation, thermal insulation and as a resin in composite materials (e.g., fiber glass and carbon fiber, etc.)

1. Ultracapacitor Devices

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the ultrapure synthetic carbon material, for example ultrapure synthetic amorphous carbon material, can be employed in various electronic devices where high power is desired. Accordingly, in one embodiment an electrode comprising ultrapure synthetic carbon materials is provided. In another embodiment an electrode comprising ultrapure synthetic amorphous carbon materials is provided.

In a further embodiment, the electrode comprises ultrapure synthetic activated carbon material, for example ultrapure synthetic activated amorphous carbon material. In a further embodiment, an ultracapacitor comprising an electrode comprising ultrapure synthetic carbon materials is provided. In a further embodiment of the foregoing, the ultrapure synthetic carbon material is an ultrapure synthetic amorphous carbon material, for example, an ultrapure synthetic activated amorphous carbon material.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

In one embodiment, an ultracapacitor device comprising the ultrapure synthetic carbon material or ultrapure synthetic amorphous carbon material comprises a gravimetric power of at least 10 W/g, at least 15 W/g, at least 20 W/g, at least 25 W/g, at least 30 W/g or at least 35 W/g. In another embodiment, an ultracapacitor device comprising the ultrapure synthetic carbon material or ultrapure synthetic amorphous carbon material comprises a volumetric power of at least 5 W/cc, at least 10 W/cc, at least 15 W/cc or at least 20 W/cc. In another embodiment, an ultracapacitor device comprising the ultrapure synthetic carbon material or ultrapure synthetic amorphous carbon material comprises a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 wh/kg or at least 25.0 Wh/kg. In another embodiment, an ultracapacitor device comprising the ultrapure synthetic activated carbon comprises a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device comprising the ultrapure synthetic carbon material or ultrapure synthetic amorphous carbon material are measured by constant current discharge from 2.7 V to 1.89 V employing a 1.0 M solution of tetraethylammonium-tetrafluororoborate in acetonitrile (1.0 M TEATFB in AN) electrolyte and a 0.5 second time constant.

In one embodiment, an ultracapacitor device comprising the ultrapure synthetic carbon material or ultrapure synthetic amorphous carbon material comprises a gravimetric power of at least 25 W/g, a volumetric power of at least 10.0 W/cc, a gravimetric energy of at least 5.0 Wh/kg and a volumetric energy of at least 3.0 Wh/L.

In another embodiment, an ultracapacitor device comprising the ultrapure synthetic carbon material or ultrapure synthetic amorphous carbon material comprises a gravimetric power of at least 15 W/g, a volumetric power of at least 10.0 W/cc, a gravimetric energy of at least 20.0 Wh/kg and a volumetric energy of at least 12.5 Wh/L.

In one embodiment, an ultracapacitor device comprising the ultrapure synthetic carbon material or ultrapure synthetic amorphous carbon material comprises a gravimetric capacitance of at least 15 F/g, at least 20 F/g, at least 25 F/g, at least 30 F/g or at least 35 F/g. In another embodiment, an ultracapacitor device comprising the ultrapure synthetic carbon material or ultrapure synthetic amorphous carbon material comprises a volumetric capacitance of at least 10 F/cc, at least 15 F/cc, at least 18 F/cc, at least 20 F/cc, at least 22 F/cc or at least 25 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluororoborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors comprising an ultrapure synthetic carbon material or ultrapure synthetic amorphous carbon material as disclosed herein, wherein the percent decrease in original capacitance (i.e., capacitance before being subjected to voltage hold) of the ultracapacitor comprising an ultrapure synthetic carbon material or ultrapure synthetic amorphous carbon material after a voltage hold period is less than the percent decrease in original capacitance of an ultracapacitor comprising known carbon materials. In one embodiment, the percent of original capacitance remaining for an ultracapacitor comprising an ultrapure synthetic carbon material or ultrapure synthetic amorphous carbon material after a voltage hold at 2.7 V for 24 hours at 65° C. is at least 90%, at least 80%, at least 70%, at least 60%, at least 50%, at least 40%, at least 30% at least 20% or at least 10%. In further embodiments of the foregoing, the percent of original capacitance remaining after the voltage hold period is measured at a current density of 0.5 A/g, 1 A/g, 4 A/g or 8 A/g.

In another embodiment, the present disclosure provides ultracapacitors comprising an ultrapure synthetic carbon material or ultrapure synthetic amorphous carbon material as disclosed herein, wherein the percent decrease in original capacitance of the ultracapacitor comprising an ultrapure synthetic carbon material or ultrapure synthetic amorphous carbon material after repeated voltage cycling is less than the percent decrease in original capacitance of an ultracapacitor comprising known carbon materials subjected to the same conditions. For example, in one embodiment, the percent of original capacitance remaining for an ultracapacitor comprising an ultrapure synthetic carbon material or ultrapure synthetic amorphous carbon material is more than the percent of original capacitance remaining for an ultracapacitor comprising known carbon materials after 1000, 2000, 4000, 6000, 8000, or 1000 voltage cycling events comprising cycling between 2 V and 1V at a current density of 4 A/g. In another embodiment, the percent of original capacitance remaining for an ultracapacitor comprising an ultrapure synthetic carbon material or ultrapure synthetic amorphous carbon material after 1000, 2000, 4000, 6000, 8000, or 1000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

As noted above, the ultrapure synthetic carbon material and ultrapure synthetic amorphous carbon material can be incorporated into ultracapacitor devices. In some embodiments, the ultrapure synthetic carbon material or ultrapure synthetic amorphous carbon material are milled to an average particle size of about 10 microns using a Labomill jetmill operating in a nitrogen atmosphere. While not wishing to bebound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling the carbon is blended with a fibrous Teflon binder (3% by weight) to hold the particles together in a sheet. The carbon Teflon mixture is kneaded until a uniform consistency is reached. Then the mixture is rolled into sheets using a high-pressure roller-former that results in a final thickness of 50 microns. These electrodes are punched into discs and heated to 195° C. under a dry argon atmosphere to remove water and/or other airbourne contaminants. The electrodes are weighed and their dimensions measured using calipers.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl,methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide.

In some embodiments, the electrodes are wetted with a 1.0 M solution of tetraethylammonium-tetrafluororoborate in acetonitrile (1.0 M TEATFB in AN) electrolyte. In other embodiments, the electrodes are wetted with a 1.0 M solution of tetraethylammonium-tetrafluororoborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for 20 minutes or more depending on the porosity of the sample.

In some embodiments, the capacitance and power output are measured using cyclic voltametry (CV), chronopotentiometry (CP) and impedance spectroscopy at various voltages (ranging from 1.0-2.5 V maximum voltage) and current levels (from 1-10 mA) on an Biologic VMP3 electrochemical workstation. In this embodiment, the capacitance may be calculated from the discharge curve of the potentiogram using the formula:

$$C = \frac{I \times \Delta t}{\Delta V} \quad \text{Equation 1}$$

where I is the current (A) and ΔV is the voltage drop, Δt is the time difference. Because in this embodiment the test capacitor is a symmetric carbon-carbon (C—C) electrode, the specific capacitance is determined from:

$$C_s = 2C/m_e \quad \text{Equation 2}$$

where $m_e$ is the mass of a single electrode. The specific energy and power may be determined using:

$$E_s = \frac{1}{4} \frac{CV_{max}^2}{m_e} \quad \text{Equation 3}$$

$$P_s = E_s/4ESR \quad \text{Equation 4}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in a nuy number of types of batteries. One such battery is the metal air battery, for example lithium air batteries. Lithium air batteries generally comprise an electrolyte interposed between positive electrode and negative electrodes. The positive electrode generally comprises a lithium compound such as lithium oxide or lithium peroxide and serves to oxidize or reduces oxygen. The negative electrode generally comprises a carbonaceous substance which absorbs and releases lithium ions. As with supercapacitors, batteries such as lithium air batteries which comprise higher purity carbon materials are expected to be superior to batteries comprising known carbon materials. Accordingly, in one embodiment the present invention provides a metal air battery, for example a lithium air battery, comprising an ultrapure synthetic carbon material or ultrapure synthetic amorphous carbon material as disclosed herein.

Any number of other batteries, for example, zinc-carbon batteries, lithium/carbon batteries, lead acid batteries and the like are also expected to perform better with higher purity carbon materials. One skilled in the art will recognize other specific types of carbon containing batteries which will benefit from higher purity carbon. Accordingly, in another embodiment the present invention provides a battery, in particular a zinc/carbon, a lithium/carbon batteries or a lead acid battery comprising an ultrapure synthetic carbon material or ultrapure synthetic amorphous carbon material as disclosed herein.

EXAMPLES

The ultrapure polymer gels, cryogels, pyrolyzed cryogels, and ultrapure synthetic amorphous carbon materials disclosed in the following Examples were prepared according to the methods disclosed herein. Chemicals were obtained from commercial sources at reagent grade purity or better and were used as received from the supplier without further purification.

Unless indicated otherwise, the following conditions were generally employed. Phenolic compound and aldehyde were reacted in the presence of a catalyst in a binary solvent system. The molar ratio of phenolic compound to aldehyde was typically 0.5 to 1. The reaction was allowed to incubate in a sealed glass ampoule at 90° C. for at least 24 hours or until gelation was complete. The resulting ultrapure polymer hydrogel contained water, but no organic solvent; and was not subjected to solvent exchange of water for an organic solvent, such as t-butanol. The ultrapure polymer hydrogel monolith was then physically disrupted, for example by milling, to form ultrapure polymer hydrogel particles having an average diameter of less than about 30 mm. Unless stated otherwise, the particles were then rapidly frozen, generally by immersion in a cold fluid (e.g. liquid nitrogen or ethanol/dry ice) and lyophilized. Generally, the lyophilizer shelf was pre-cooled to −50° C. before loading a tray containing the frozen ultrapure polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +40° C.

The dried ultrapure polymer hydrogel was typically pyrolyzed by heating in a nitrogen atmosphere at temperatures ranging from 800-1200° C. for a period of time as specified in the examples. Activation conditions generally comprised heating a pyrolyzed ultrapure polymer hydrogel in a $CO_2$ atmosphere at temperatures ranging from 900-1000° C. for a period of time as specified in the examples. Specific pyrolysis and activation conditions were as described in the following examples.

Example 1

Production of RF Gels from 100% Acetic Acid Solution

A series of RF gels were made form "neat" acetic acid (i.e., anhydrous). Three samples were produced with varying levels of ammonium carbonate (as "catalyst"): none, and ~100 and ~25 R/C. These samples were crushed by hand to create particles, frozen by immersion in liquid nitrogen, and lyophilized. A summary of these formulations and their specific surface areas is presented in Table 1. All three samples were monolithic and orange in color. Color intensity was greater for those samples containing ammonium carbonate. The specific surface area of the three samples were between 597 and 644 m²/g.

FIG. 1 presents the incremental pore volume vs. pore width for these samples. The sample prepared without catalyst had a DFT average pore size of about 185 Å, with a broad peak between about 100 and 1000 Å, and a secondary peak at about 14 Å (and was relatively devoid of pore volume in between). In contrast, as catalyst was added the main broad peak demonstrated a shift in the distribution towards lower pore widths (there was also a secondary peak at about 12 to 16 Å). The DFT average pore size for samples containing about 100 and about 25 R/C ammonium carbonate were about 78 Å and 45 Å, respectively. Interestingly, these latter samples were relatively devoid of pores above 300 Å.

TABLE 1

Summary of gels produced from 100% acetic acid solution (no water added prior to addition of formaldeyde)

| Sample    | R/S | R/C | Final pH | Gelling conditions | Dried Gel Specific Surface Area (m²/g) |
|-----------|-----|-----|----------|--------------------|----------------------------------------|
| 003-113-2 | 0.3 | ∞   | 2.0      | O/N @ 90° C.       | 644                                    |
| 003-113-3 | 0.3 | 95  | 1.9      |                    | 597                                    |
| 003-113-4 | 0.3 | 25  | 2.1      |                    | 605                                    |

Abbreviations:
R/S = ratio of resorcinol to solvent (in g/mL);
R/C = ratio of resocorcinol to catalyst (in g/g);
O/N = overnight, typically about 18 hours.

Example 2

Production of RF Gels from 90:10 Acetic Acid:Water (vol:vol) Solution

In order to examine the effect of addition of a small amount of water in the system, a series of RF gels were produced from a mixed solvent of acetic acid:water in a 90:10 vol:vol ratio (prior to addition of formaldehyde). Three samples were produced with varying levels of ammonium carbonate: none, and ~100 and ~25 R/C. These samples were crushed by hand to create particles, frozen by immersion in liquid nitrogen, and lyophilized.

A summary of these formulations and their specific surface areas are presented in Table 2. All three samples were monolithic and orange in color. Color intensity was greater for those samples containing ammonium carbonate. The specific surface area of the three samples was between 586 and 653 m2/g.

Figure 2:
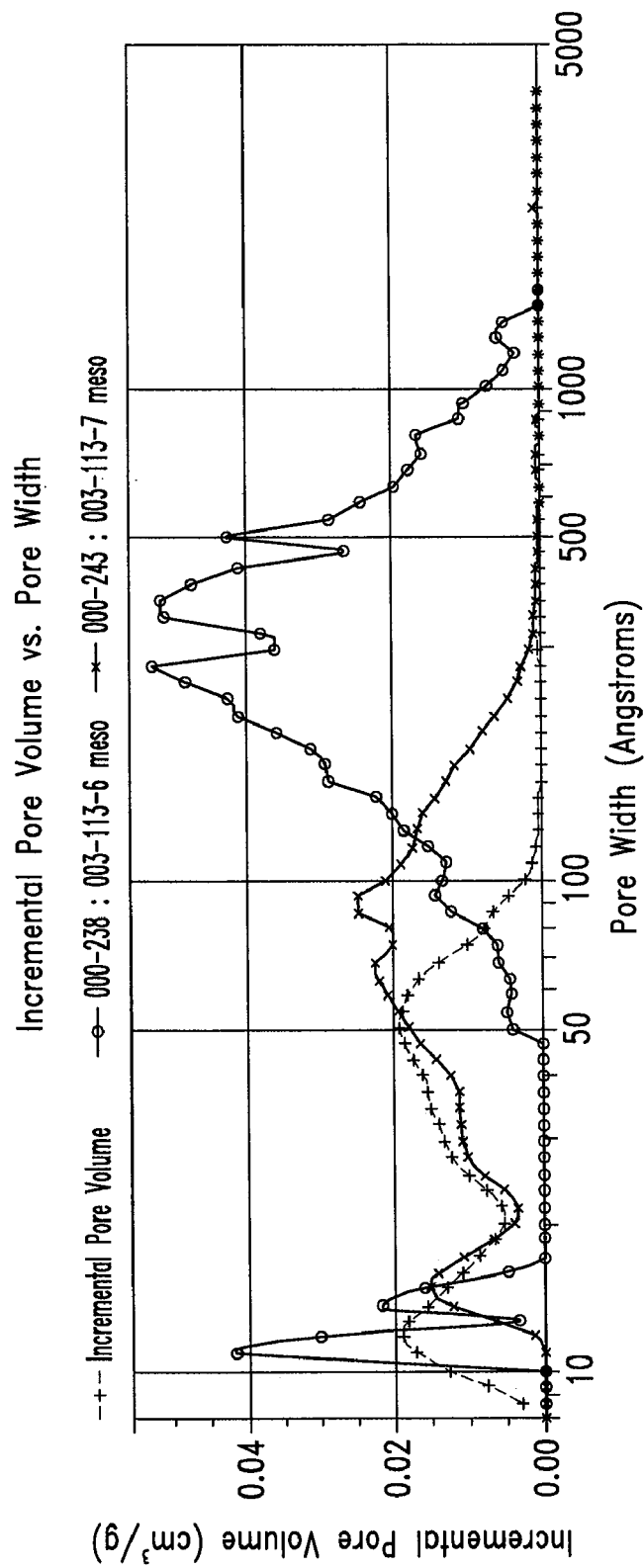
FIG. 2 depicts incremental pore volume vs. pore width for RF ultrapure polymer cryogels produced from 90:10 acetic acid:water solvent.

FIG. 2 presents the incremental pore volume vs. pore width for these samples. The sample prepared without catalyst had a DFT average pore size of about 160 Å, with a broad peak between about 100 and 1000 Å, and secondary peaks at about 11 Å and 13 Å (and was relatively devoid of pore volume in between). In contrast, as catalyst was added the main broad peak demonstrated a shift in the distribution towards lower pore widths (there were also secondary peaks over the range of about 12 Å to 15 Å). The DFT average pore size for samples containing about 100 and about 25 R/C ammonium carbonate were about 59 Å and 39 Å, respectively. Overall, the trends for the 90:10 acetic acid:water samples were similar to those observed for the case where the resorcinol was initially dissolved in 100% acetic acid discussed above.

TABLE 2

Summary of RF gels produced from 50:50 acetic acid:water (vol:vol) solution (prior to addition of formaldehyde)

| Sample    | R/S | R/C | Final pH | Gelling conditions | Dried Gel Specific Surface Area (m²/g) |
|-----------|-----|-----|----------|--------------------|----------------------------------------|
| 003-113-6 | 0.3 | ∞   | 1.3      | O/N @ 90° C.       | 653                                    |
| 003-113-7 | 0.3 | 100 | 1.9      |                    | 599                                    |
| 003-113-8 | 0.3 | 25  | 2.1      |                    | 586                                    |

Abbreviations:
R/S = ratio of resorcinol to solvent (in g/mL);
R/C = ratio of resocorcinol to catalyst (in g/g);
O/N = overnight, typically about 18 hours.

Example 3

Production of RF Gels from 50:50 Acetic Acid:Water (vol:vol) Solution

To further examine the effect of addition of water, a series of RF gels were produced from 50:50 acetic acid:water (prior to addition of formaldehyde). Three samples were produced with varying levels of ammonium carbonate: none, and ~100 and ~25 R/C. A fourth sample was made with the addition of ammonium acetate at a ratio of ~25 R/C. These samples were crushed by hand to create particles, frozen by immersion in liquid nitrogen, and lyophilized.

A summary of these formulations and their specific surface areas are presented in Table 3. All four samples were monolithic and orange in color. Color intensity was greater for those samples containing ammonium carbonate or ammonium acetate. The specific surface area of the four samples was between 560 and 693 m²/g.

Figure 3:
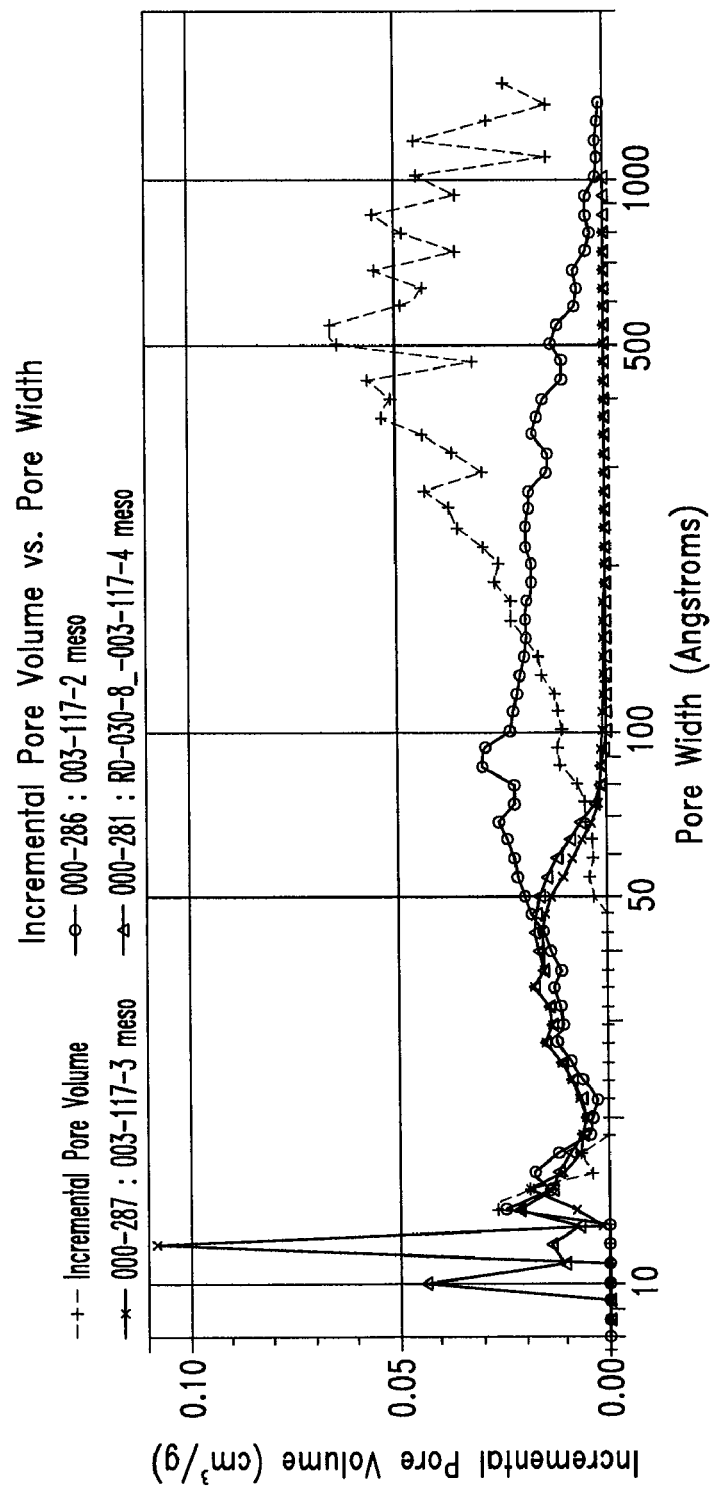
FIG. 3 depicts incremental pore volume vs. pore width for RF ultrapure polymer cryogels produced from 50:50 acetic acid:water solvent.

FIG. 3 presents the incremental pore volume vs. pore width for these samples. The sample prepared without catalyst had a DFT average pore size of about 193 Å, with a broad peak between about 100 and 1000 Å, and a secondary peak at about 14 Å (and was relatively devoid of pore volume in between). In contrast, as catalyst was added, the main broad peak demonstrated a shift in the distribution towards lower pore widths (there was also a secondary peak at about 10 Å to 14 Å). The DFT average pore size for samples containing about 100 and about 25 R/C ammonium carbonate were about 79 Å and 32 Å, respectively. The DFT average pore size for the sample containing about 25 R/C ammonium acetate was about 33 Å. Overall, the trends for the 50:50 acetic acid:water samples were similar to those observed for the case where the resorcinol was initially dissolved in 100% acetic acid or 90:10 acetic acid:water as discussed above.

TABLE 3

Summary of RF gels produced from 50:50 acetic acid:water (vol:vol) solution (prior to addition of formaldehyde)

| Sample | R/S | R/C | Final pH | Gelling conditions | Dried Gel Specific Surface Area (m²/g) |
|---|---|---|---|---|---|
| 003-117-1 | 0.3 | ∞ | 1.4 | O/N @ 90° C. | 693 ± 27 |
| 003-117-2 | 0.3 | 95 | 2.0 | | 663 ± 23 |
| 003-117-3 | 0.3 | 25 | 2.5 | | 600 ± 40 |
| 003-117-4 (Amm. Acetate) | 0.3 | 24 | 2.4 | | 560 |

Abbreviations:
R/S = ratio of resorcinol to solvent (in g/mL);
R/C = ratio of resocorcinol to catalyst (in g/g);
O/N = overnight, in this case additional samples were incubated for an additional day, resulting in a total time of about 36 h. Where specific surface areas are given as average and standard deviation, values are calculated from two data points.

Example 4

Production of RF Gels from 25:75 Acetic Acid:Water (vol:vol) Solution

The next system was comprised predominantly of water, specifically 25:75 acetic acid:water (prior to addition of formaldehyde). Three samples were produced with varying levels of ammonium carbonate: none, and ~100 and ~25 R/C. A fourth sample was made with the addition of ammonium acetate at a ratio of ~25 R/C. These samples were crushed by hand to create particles, frozen by immersion in liquid nitrogen, and lyophilized.

A summary of these formulations and their specific surface areas are presented in Table 4. Additional samples that were produced with ammonium acetate at lower R/C ratios of 10:1 and 1:1 are also included in the table. Sample prepared in absence of catalyst was light orange in color and after drying the cryogel had a specific surface area of about 340 m²/g. Those samples containing ammonium carbonate or ammonium acetate were darker in color (in particular for the 100 R/C samples) and also appeared less cloudy in nature. However, sample produced at the highest level of ammonium acetate, i.e., R/C 1:1 was very clay-like and wet in consistency, and exhibited an extremely low surface area. Compared to the cryogel in this series devoid of catalyst, those containing either sodium carbonate or sodium acetate at R/C of 25:1 to 100:1 had a much higher specific surface area of over 700 m²/g. Samples prepared with ammonium acetate at R/C of 10 and 1 produced a lower surface area of about 427 m²/g and 3.4 m²/g, respectively.

Figure 4:
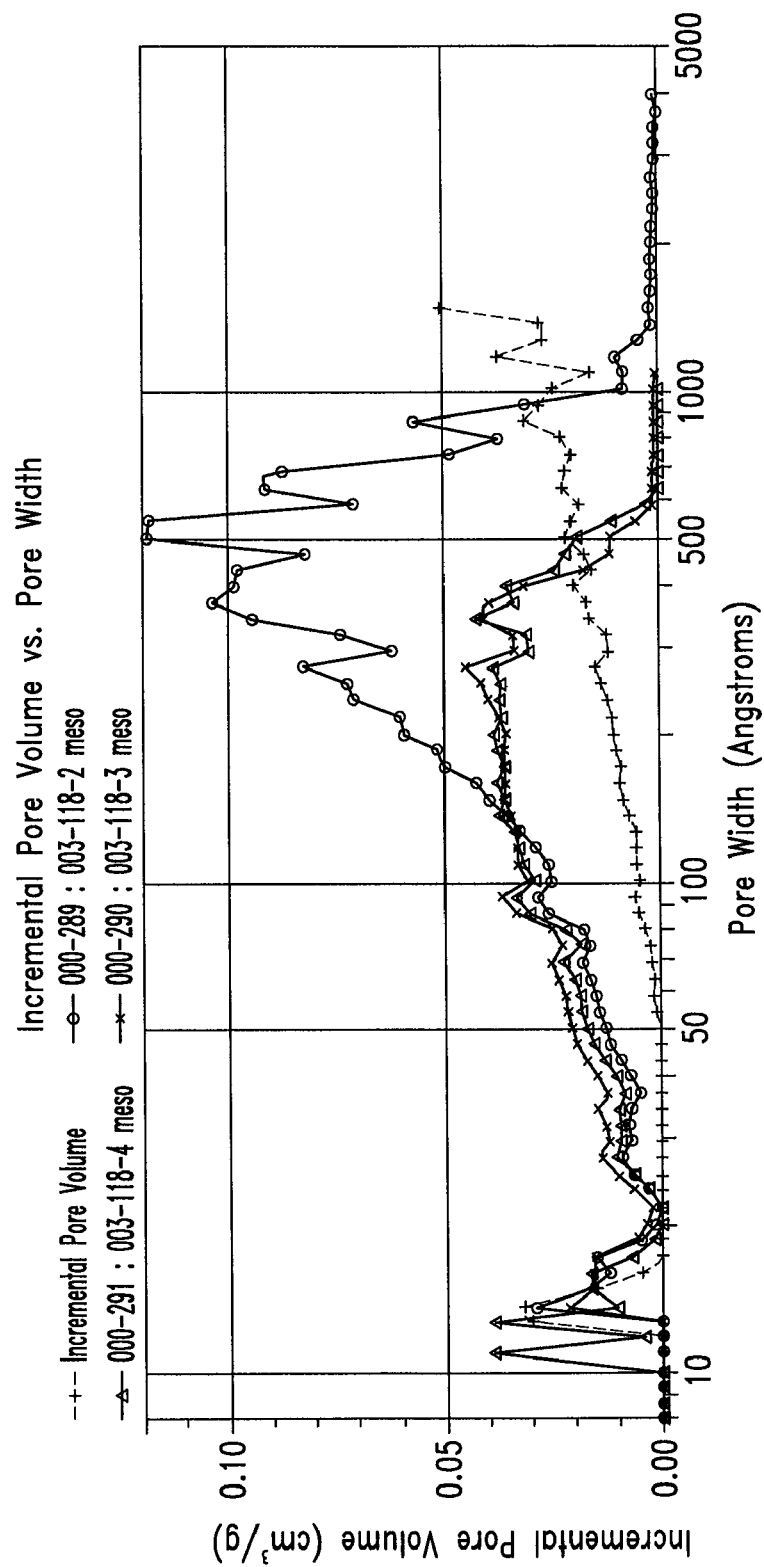
FIG. 4 presents incremental pore volume vs. pore width for RF ultrapure polymer cryogels produced from 25:75 acetic acid:water solvent.

FIG. 4 presents the incremental pore volume vs. pore width for some of these samples. The sample prepared without catalyst had a broad peak between about 100 and over 1000 Å with substantial incremental pore volume above pore width of 1000 Å, and a secondary peak at about 13 Å, and a BHJ adsorption average pore width was 193 Å. Addition of about 100 R/C ammonium carbonate shifted the distribution significantly, although the DFT adsorption average pore size was similar to that observed without catalyst (about 200 Å). Samples containing about 25 R/C ammonium carbonate or ammonium acetate exhibited a shift in the distribution towards lower pore widths, resulting in DFT average pore size of about 92 Å and 104 Å, respectively. All samples exhibited peaks in incremental pore volume over the pore width range of about 12 to 16 Å.

TABLE 4

Summary of RF gels produced from 25:75 acetic acid:water (vol:vol) solution (prior to addition of formaldehyde)

| Sample | R/S | R/C | Final pH | Gelling conditions | Dried Gel Specific Surface Area (m²/g) |
|---|---|---|---|---|---|
| 003-118-1 | 0.3 | ∞ | 2.3 | O/N @ 90° C. | 469 |
| 003-118-2 | 0.3 | 97 | 2.9 | | 722 |
| 003-118-3 | 0.3 | 25 | 3.3 | | 724 |
| 003-118-4 (Amm. acetate) | 0.3 | 24 | 3.1 | | 728 |
| 003-127-3 (Amm. Acetate) | 0.3 | 10 | 3.5 | | 427 |
| 003-127-4 (Amm. Acetate) | 0.3 | 1 | 3.9 | | 3.4 |

Abbreviations:
R/S = ratio of resorcinol to solvent (in g/mL);
R/C = ratio of resorcinol to catalyst (in g/g);
O/N = overnight, typically about 18 hours.

Example 5

Production of RF Gels from 10:90 Acetic Acid:Water (vol:vol) Solution

An analogous series of samples was prepared at 10:90 acetic acid:water (prior to addition of formaldehyde). Three samples were produced with varying levels of ammonium carbonate: none, and ~100 and ~25 R/C. A fourth sample was made with the addition of ammonium acetate at a ratio of ~25 R/C. These samples were crushed by hand to create particles, frozen by immersion in liquid nitrogen, and lyophilized.

A summary of these formulations and their specific surface areas is presented in Table 5. The sample prepared in this series without catalyst was visually somewhat monolithic, but very clay-like and wet in consistency, and very light orange color. Upon drying, the material exhibited an extremely low surface area of <1 m²/g. Samples with ammonium salts were darker in color, and appeared less cloudy. These samples also exhibited a much higher specific surface area in the cryogel. In addition, there was a trend for increasing specific surface area for the higher levels of ammonium salts.

Figure 5:
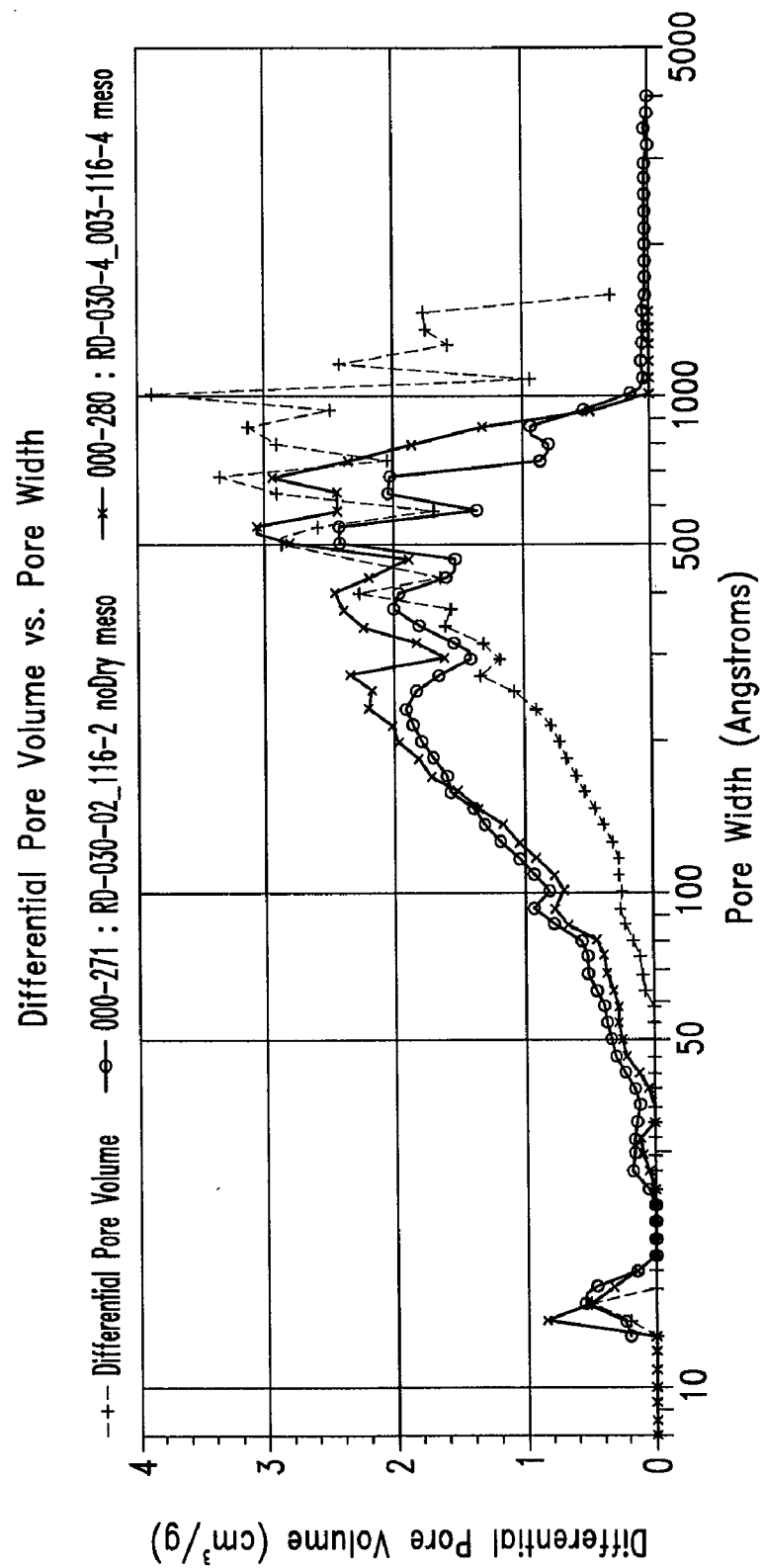
FIG. 5 presents incremental pore volume vs. pore width for RF ultrapure polymer cryogels produced from 10:90 acetic acid:water solvent.

FIG. 5 presents the incremental pore volume vs. pore width for the samples from this series that included an ammonium salt. The distribution for all three samples was similar, with a trend towards a very minor shifting in the distribution in the presence of higher amount of catalyst. Specifically, in the presence of ammonium carbonate R/C 100:1, the BHJ adsorption average pore width was 338 Å, compared to 187 Å and 201 Å in the presence of R/C 25:1 ammonium carbonate and ammonium acetate, respectively.

TABLE 5

Summary of RF gels produced from 10:90 acetic acid:water (vol:vol) solution (prior to addition of formaldehyde)

| Sample | R/S | R/C | Final pH | Gelling conditions | Dried Gel Specific Surface Area (m²/g) |
|---|---|---|---|---|---|
| 003-116-3 | 0.3 | ∞ | 2.2 | O/N @ 90° C. | 0.5 |
| 003-116-1 | 0.3 | 99 | 2.9 | | 327 ± 10 |
| 003-116-2 | 0.3 | 25 | 3.6 | | 429 |
| 03-116-4 | 0.3 | 24 | 3.2 | | 539 ± 175 |

Abbreviations:
R/S = ratio of resorcinol to solvent (in g/mL);
R/C = ratio of resocorcinol to catalyst (in g/g);
O/N = overnight, typically about 18 h.

Example 6

Production of RF Gels from 1:99 Acetic Acid:Water (vol:vol) Solution

Yet another, lower ratio of acetic acid to water was studied, namely 1:99 (prior to addition of formaldehyde). Three samples were produced with varying levels of ammonium carbonate: none, and ~100 and ~25 R/C. A fourth sample was made with the addition of ammonium acetate at a ratio of ~25 R/C. These samples were crushed by hand to create particles, frozen by immersion in liquid nitrogen, and lyophilized.

A summary of these formulations and their specific surface areas is presented in Table 6. All samples were clay-like and wet in consistency. The sample prepared without catalyst exhibited an extremely low surface area of 1.5 m²/g. Compared to samples produced at higher amounts of acetic acid, samples in this series were generally light orange in color and cloudy in nature. Samples where an ammonium salt was added exhibited moderately high specific surface area, in the range of 140 to 278 m²/g, but generally lower than values obtained for samples prepared at higher acetic acid content.

TABLE 6

Summary of RF gels produced from 1:99 acetic acid:water (vol:vol) solution (prior to addition of formaldehyde)

| Sample | R/S | R/C | Final pH | Gelling conditions | Dried Gel Specific Surface Area (m²/g) |
|---|---|---|---|---|---|
| 003-119-1 | 0.3 | ∞ | 2.9 | O/N @ 90° C. | 1.5 |
| 003-119-2 | 0.3 | 101 | 4.3 | | 210 |
| 003-119-3 | 0.3 | 25 | 5.0 | | 140 |
| 03-119-4 | 0.3 | 24 | 4.3 | | 278 |

Abbreviations:
R/S = ratio of resorcinol to solvent (in g/mL);
R/C = ratio of resocorcinol to catalyst (in g/g);
O/N = overnight, typically about 18 hours.

Example 7

Relationship Between pH and Surface Characteristics for Various RF Gels

Figure 6:
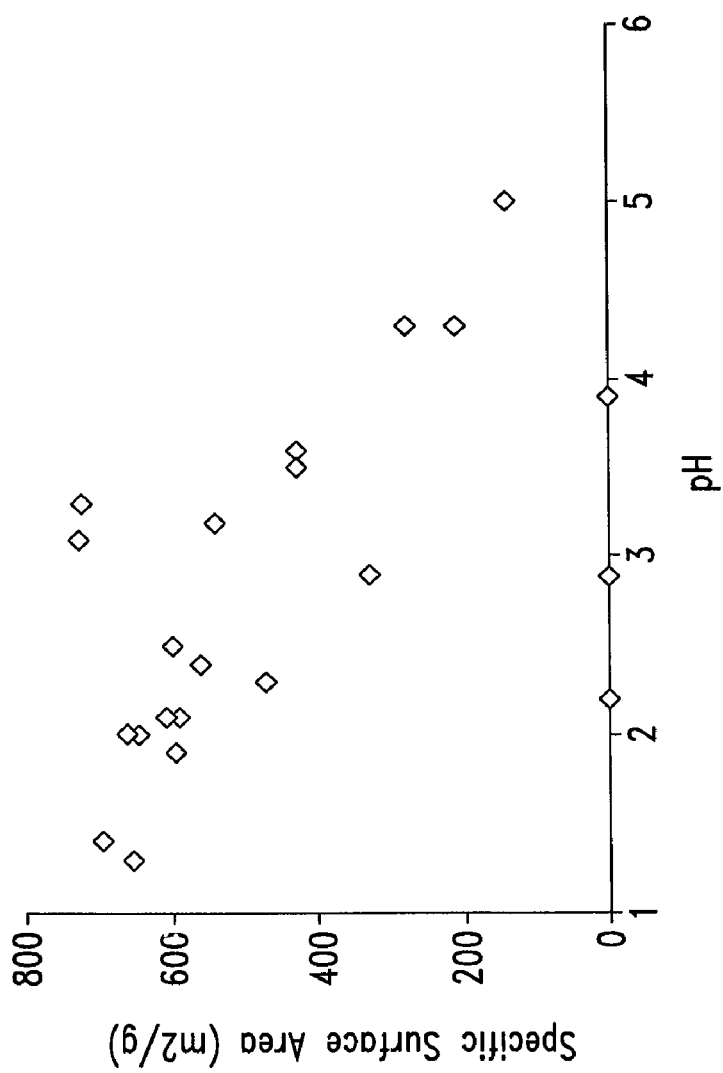
FIG. 6 is a plot of specific surface area vs. pH for RF ultrapure polymer cryogels produced from RS=0.3 and varying levels of acetic acid and ammonium salts.

A plot of specific surface area vs. pH for all samples is presented in FIG. 6. As can be seen, there was a general trend towards higher specific surface area as pH decreases. However, notable exceptions are the samples 003-116-3 and 003-119-1 (which are materials produced from the two lowest acetic acid contents studied and do not contain any ammonium salts), and sample 003-127-4 (which was produced from 25% acetic acid and the highest amount of ammonium acetate studied, R/C=1). A similar plot of pH vs. DFT adsorption average pore width does not reflect any discernable trend. Therefore, the pH alone does not appear to be a controlling variable for tuning pore width distribution in the RF ultrapure polymer gel, and must be considered along with the amount (and type) of catalyst added, in this case, basic ammonium salts, specifically carbonate or acetate.

Example 8

Production of RF Gels from 25:75 Acetic Acid: Water and RS Ratio of 0.6

Table 7 presents data for RF ultrapure polymer gels that were produced from 25:75 acetic acid:water, and in this case, the RS is relatively high, namely 0.6. Samples in this series were hard and monolithic and samples with ammonium salts exhibited notably higher specific surface area (591 to 612 m²/g) compared to the corresponding ultrapure polymer gel absent any ammonium salt (specific surface area of 271 m²/g).

TABLE 7

Summary of RF gels produced from 25:75 acetic acid:water (vol:vol) solution (prior to addition of formaldehyde), and RS = 0.6

| Sample | R/S | R/C | Final pH | Gelling conditions | Dried Gel Specific Surface Area (m²/g) |
|---|---|---|---|---|---|
| 006-048-1 | 0.6 | ∞ | 2.9 | 72 h @ 90° C. | 271 |
| 006-048-2 | 0.6 | 100 | 3.6 | | 612 |
| 006-048-3 | 0.6 | 25 | 4.1 | | 595 |
| 006-048-4 | 0.6 | 25 | 3.9 | | 591 |

Abbreviations:
R/S = ratio of resorcinol to solvent (in g/mL);
R/C = ratio of resocorcinol to catalyst (in g/g).

Example 9

Pyrolysis of RF Ultrapure Polymer Gels

Eight samples from those discussed above were pyrolyzed. The details of these samples are provided in Table 8. All samples in the Table were pyrolyzed via incubation at 900° C. for a dwell time of 60 min. The weight loss upon pyrolysis was 53±3%. In general, the specific surface area of the pyrolyzed gel was similar to that for the dried ultrapure polymer gel before pyrolysis.

TABLE 8

Summary of pyrolyzed samples

| Sample | Dried Gel Specific Surface Area (m²/g) | Pyrolysis Weight Loss (%) | Pyrolyzed Gel Specific Surface Area (m²/g) |
|---|---|---|---|
| 003-116-4 PC | 539 ± 179 | 56 | 743 |
| 003-117-1 PC | 693 ± 27 | 57 | 697 |
| 003-117-2 PC | 663 ± 23 | 57 | 699 |
| 003-117-3 PC | 600 ± 40 | 56 | 548 |
| 003-117-4 PC | 560 | 56 | 573 |

TABLE 8-continued

Summary of pyrolyzed samples

| Sample | Dried Gel Specific Surface Area (m²/g) | Pyrolysis Weight Loss (%) | Pyrolyzed Gel Specific Surface Area (m²/g) |
|---|---|---|---|
| 003-118-2 PC | 722 | 52 | 705 ± 24 |
| 003-118-3 PC | 724 | 52 | 702 |
| 003-118-4 PC | 728 | 51 | 689 ± 24 |

Figure 7A:
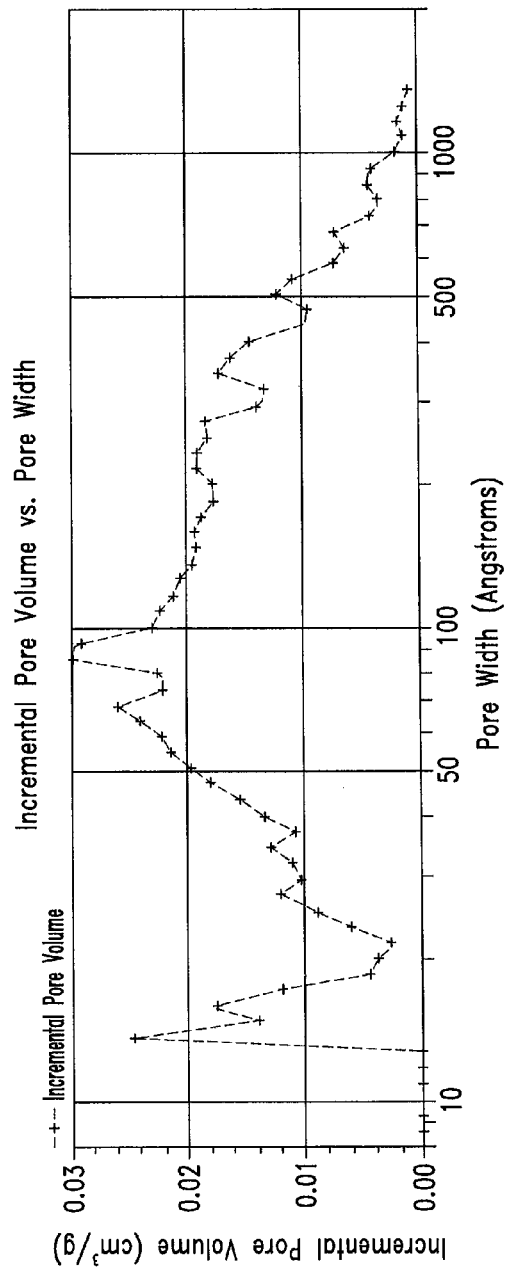
FIGS. 7A and 7B are plots of incremental pore volume of a RF ultrapure polymer cryogel and a pyrolyzed RF ultrapure polymer cryogel, respectively.
Figure 7B:
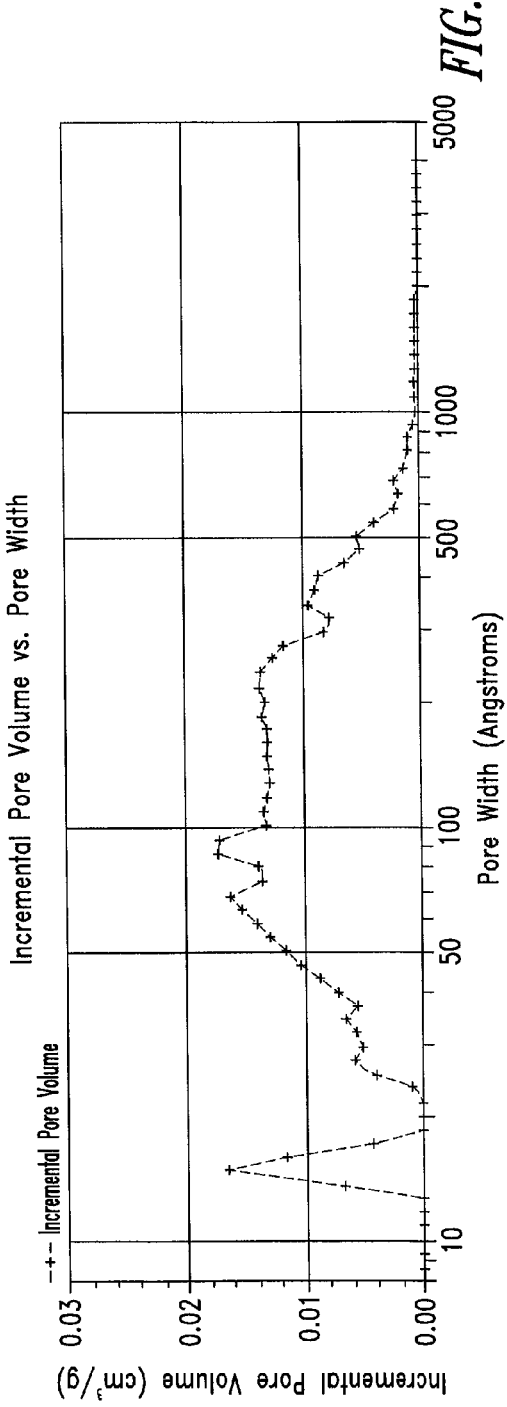
Figure 8A:
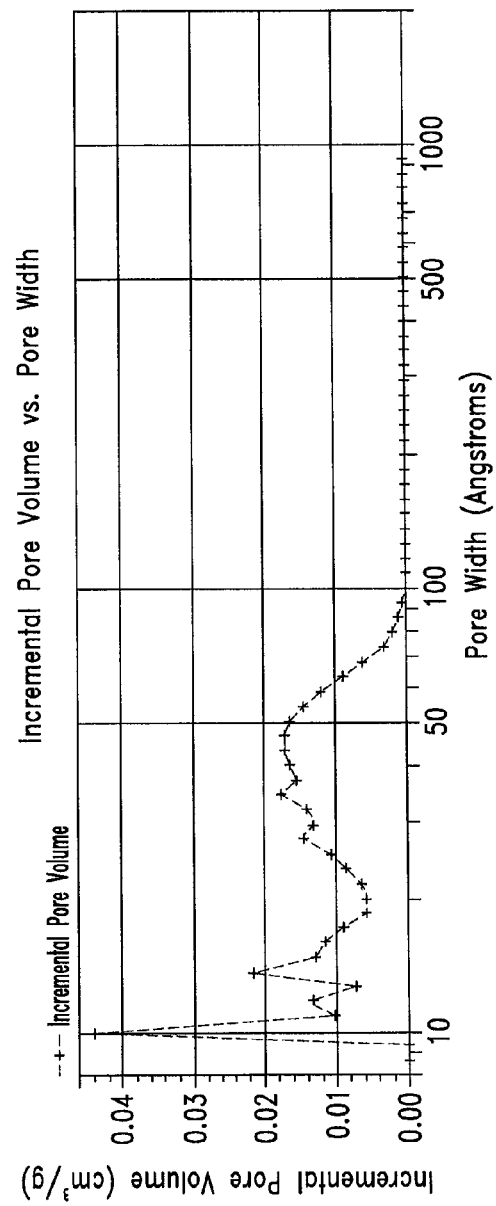
FIGS. 8A and 8B are plots of incremental pore volume of a RF ultrapure polymer cryogel and a pyrolyzed RF ultrapure polymer cryogel, respectively.
Figure 8B:
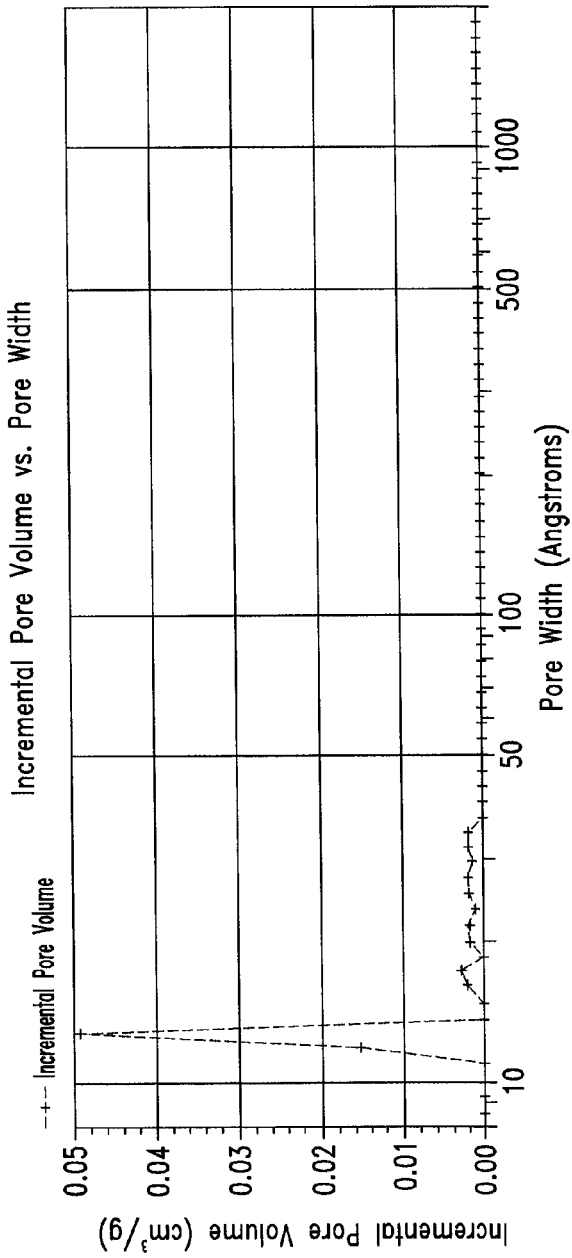
Figure 9A:
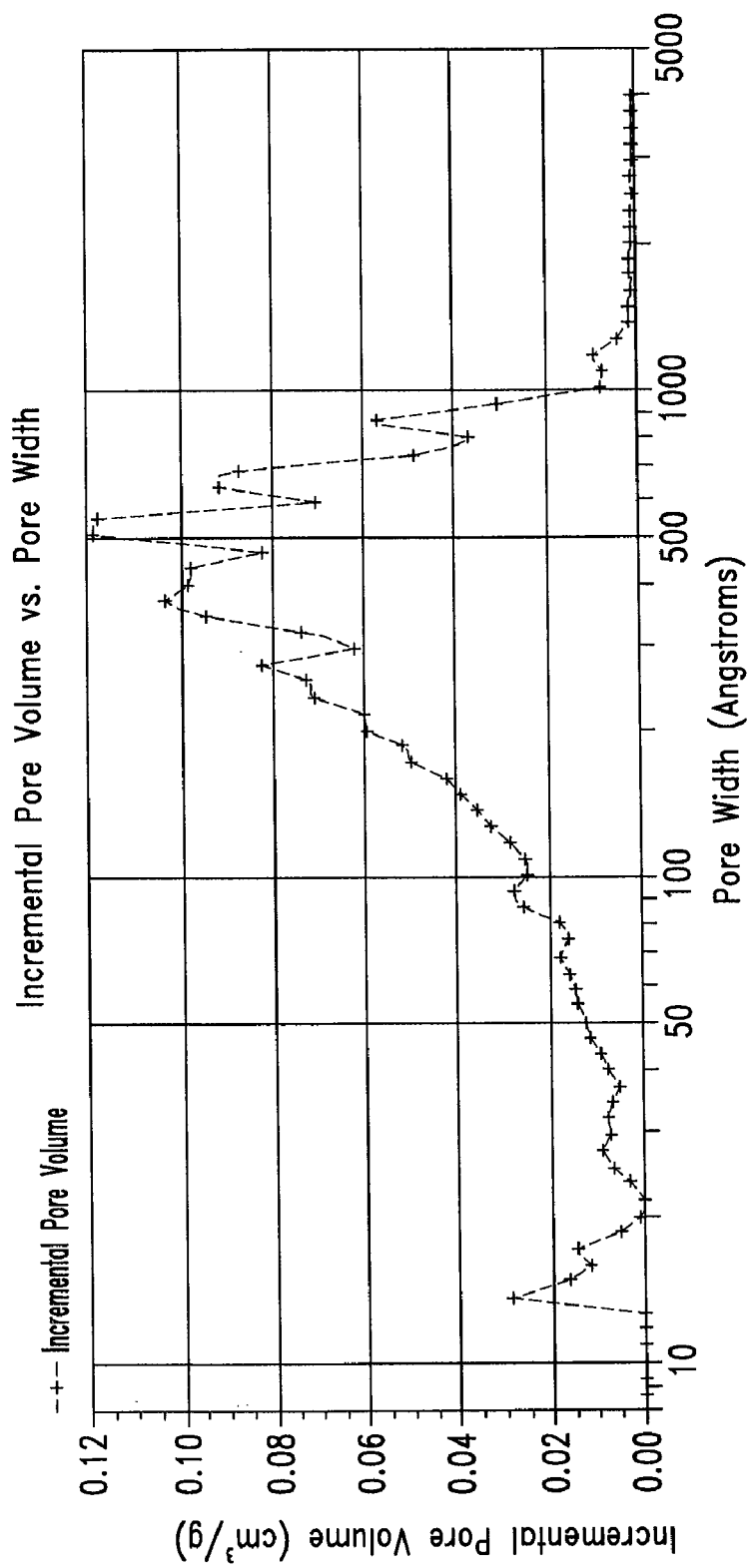
FIGS. 9A and 9B are plots of incremental pore volume of a RF ultrapure polymer cryogel and a pyrolyzed RF ultrapure polymer cryogel, respectively.
Figure 9B:
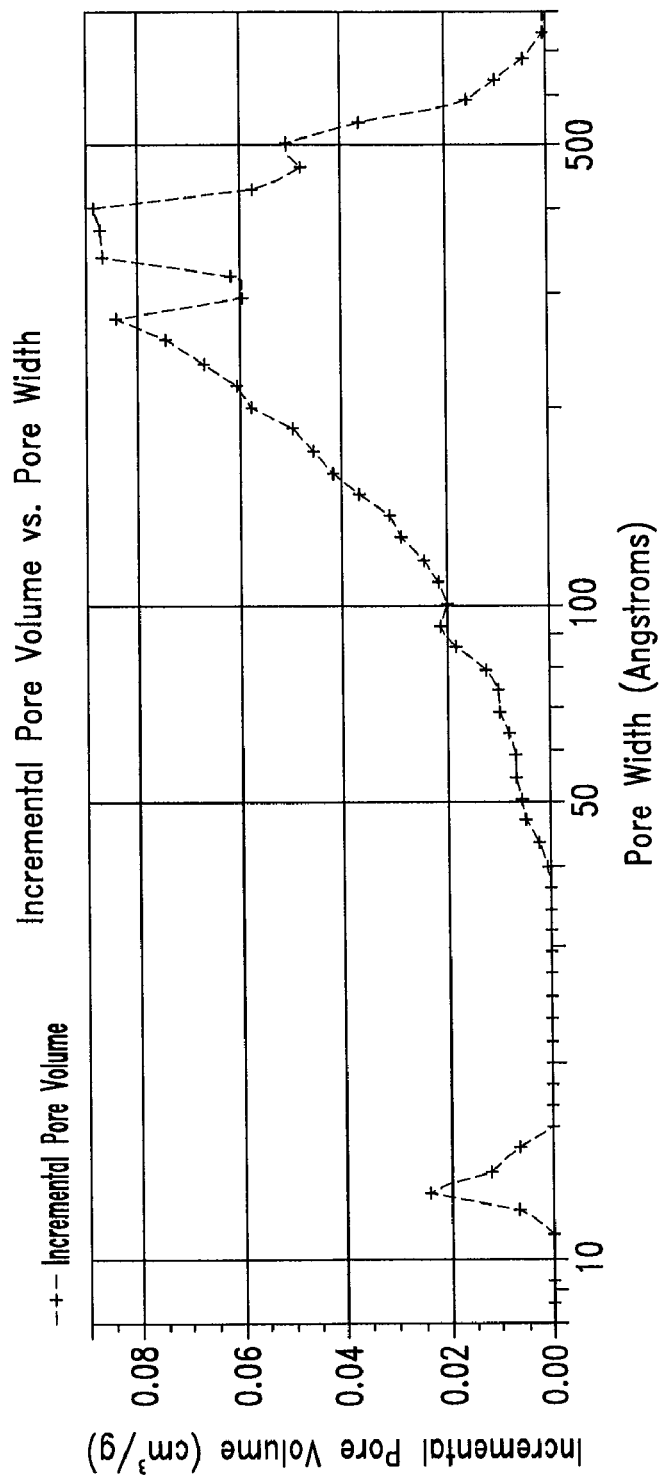
Figure 10A:
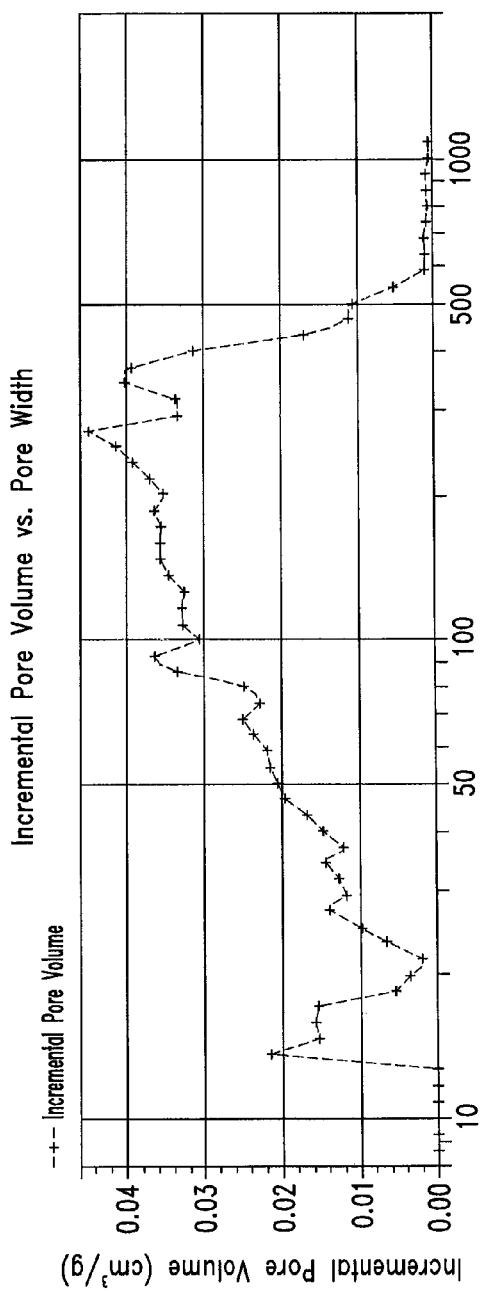
FIGS. 10A and 10B are plots of incremental pore volume of a RF ultrapure polymer cryogel and a pyrolyzed RF ultrapure polymer cryogel, respectively.
Figure 10B:
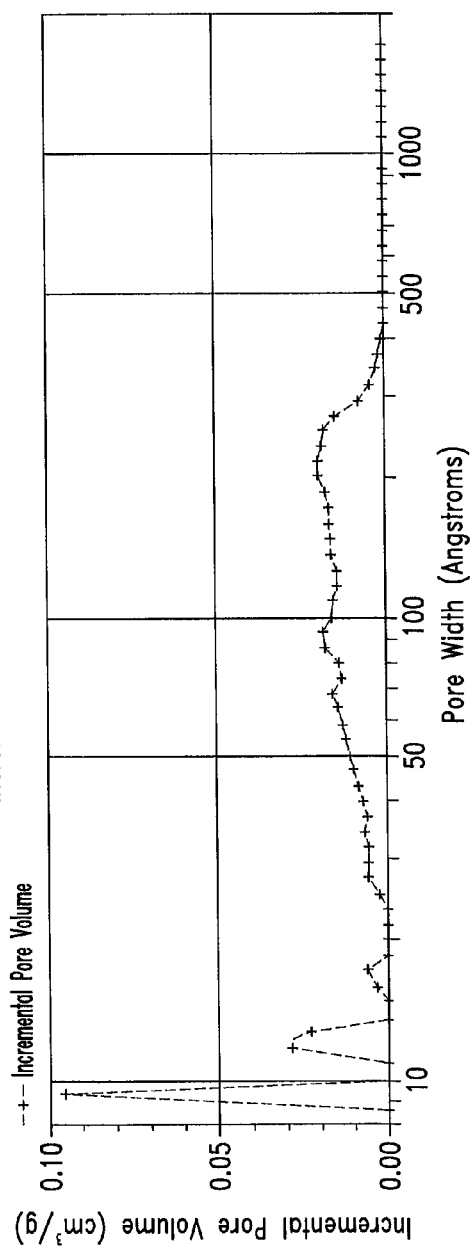
Figure 11A:
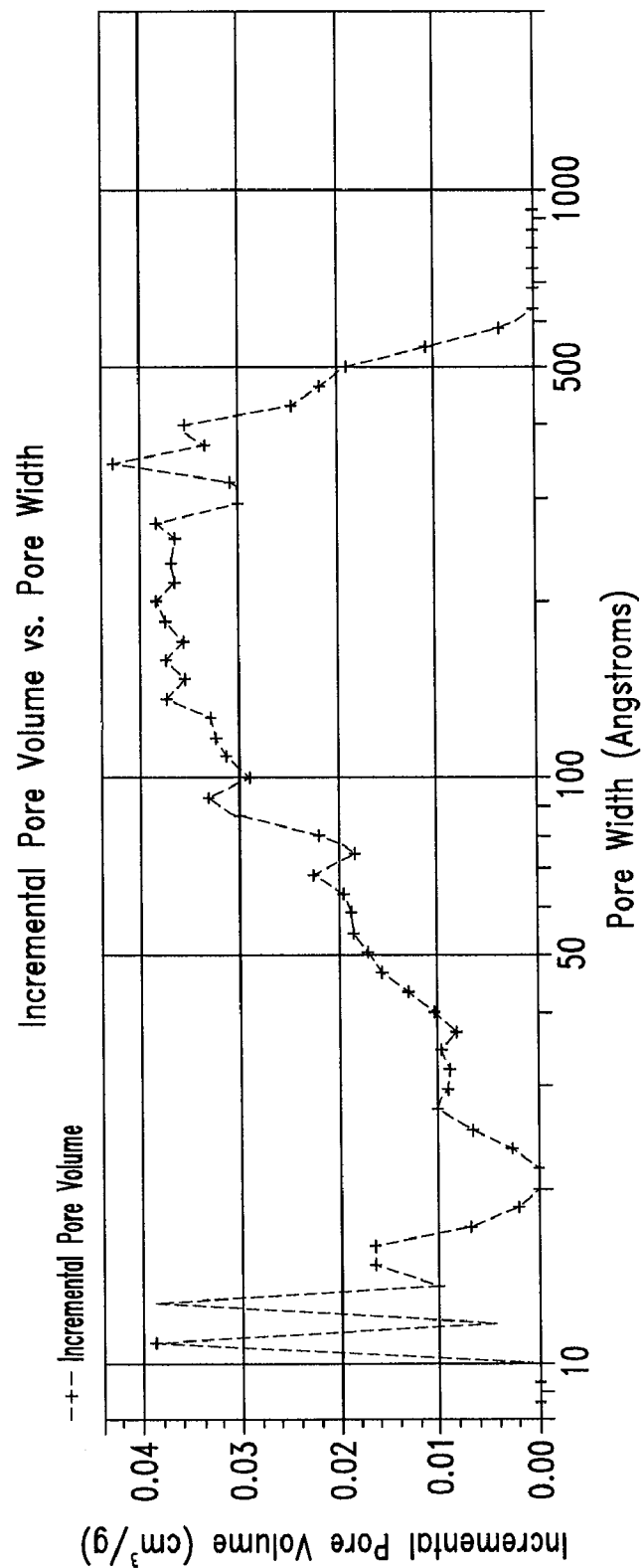
FIGS. 11A and 11B are plots of incremental pore volume of a RF ultrapure polymer cryogel and a pyrolyzed RF ultrapure polymer cryogel, respectively.
Figure 11B:
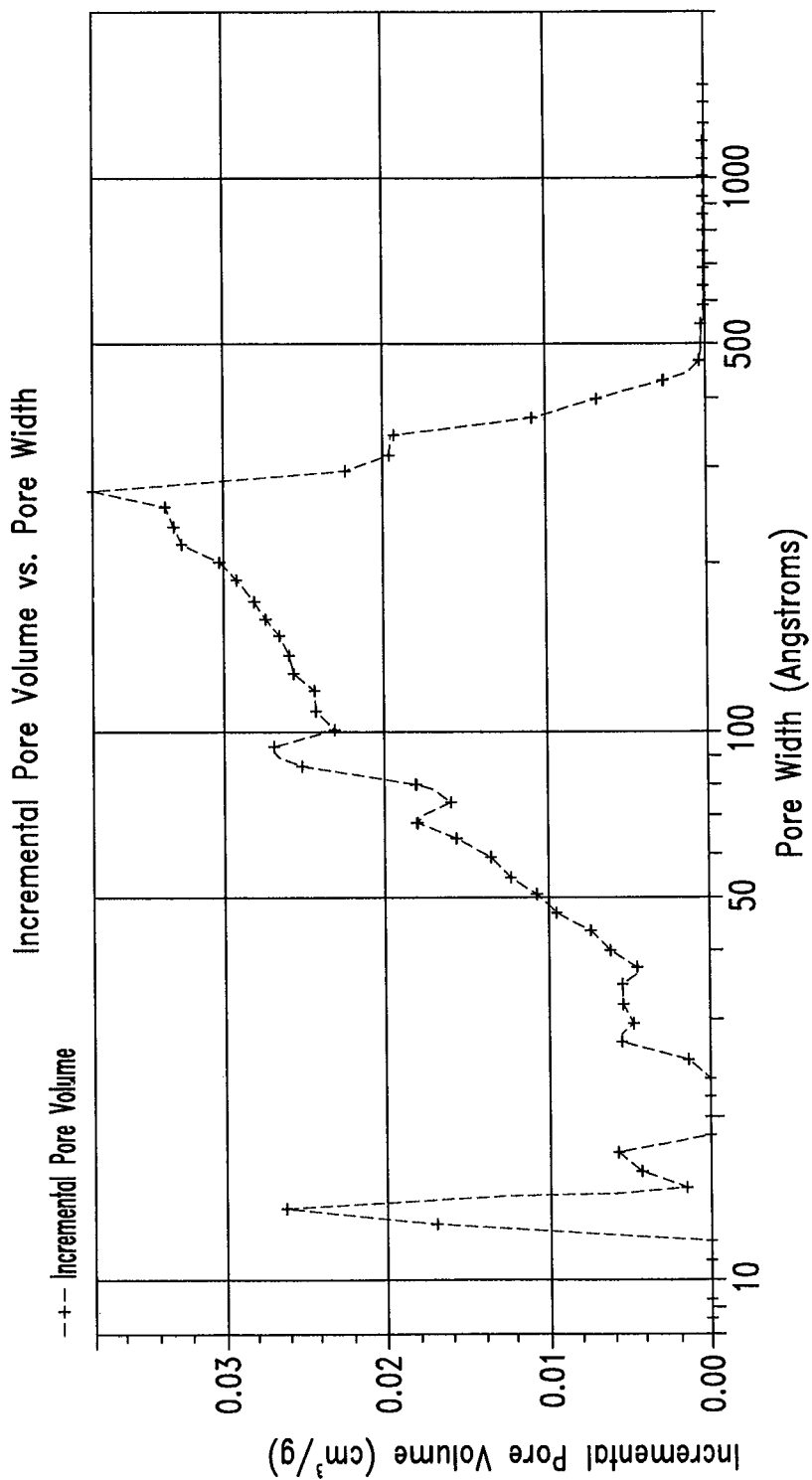

The pore size distribution in the pyrolyzed gel was related to that for the dried ultrapure polymer gel before pyrolysis. Specifically, there was a trend towards a shift in the incremental pore volume vs. pore width towards lower pore widths. For example, FIG. 7 shows the incremental pore volume vs. pore width plot for sample 003-117-2 before (FIG. 7A) and after (FIG. 7B) the pyrolysis. It can be seen that the overall distribution was similar, with a slight shift towards lower pore width after pyrolysis.

Further examples are provided in FIG. 8, FIG. 9, FIG. 10 and FIG. 11 for samples 003-117-4, 003-118-2, 003-118-3, and 003-118-4, respectively. In each case, the pore width distribution in the pyrolyzed sample (FIGS. 8B, 9B, 10B, and 11B) is reflective of the dried ultrapure polymer gel before pyrolysis (and slightly shifted downwards towards smaller pore widths) (FIGS. 8A, 9A, 10A, and 11A). These data are important in showing that tunability in the dried ultrapure polymer gel is carried over into tunability for the pyrolyzed material.

Example 10

Preparation of Ultrapure Synthetic Activated Carbon Materials

Figure 12:
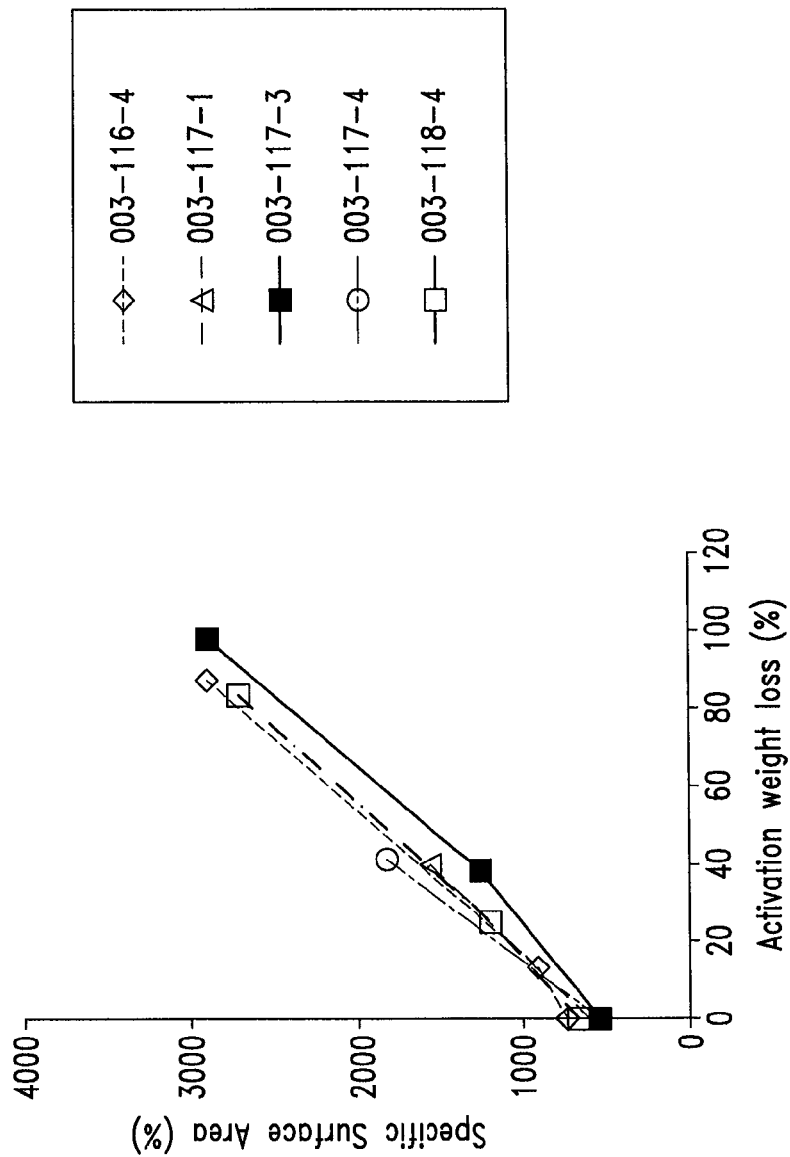
FIG. 12 depicts the specific surface area vs. activation weight loss for various ultrapure synthetic activated carbon materials.

Ultrapure synthetic activated carbon material was prepared from the pyrolyzed samples. A summary of the ultrapure synthetic activated carbons produced is presented in Table 9. A plot of the percent weight loss during the activation process vs the specific surface area is depicted in FIG. 12. As can be seen, there was a trend of increasing specific surface area with increasing activation weight loss. There was a trend observed that samples with high specific surface area in the pyrolyzed material tended to have a higher specific surface area in the activated carbon for a given activation weight loss. These data show that high specific surface area ultrapure synthetic activated carbons can be produced from the ultrapure polymer gel formulations described herein.

Figure 13:
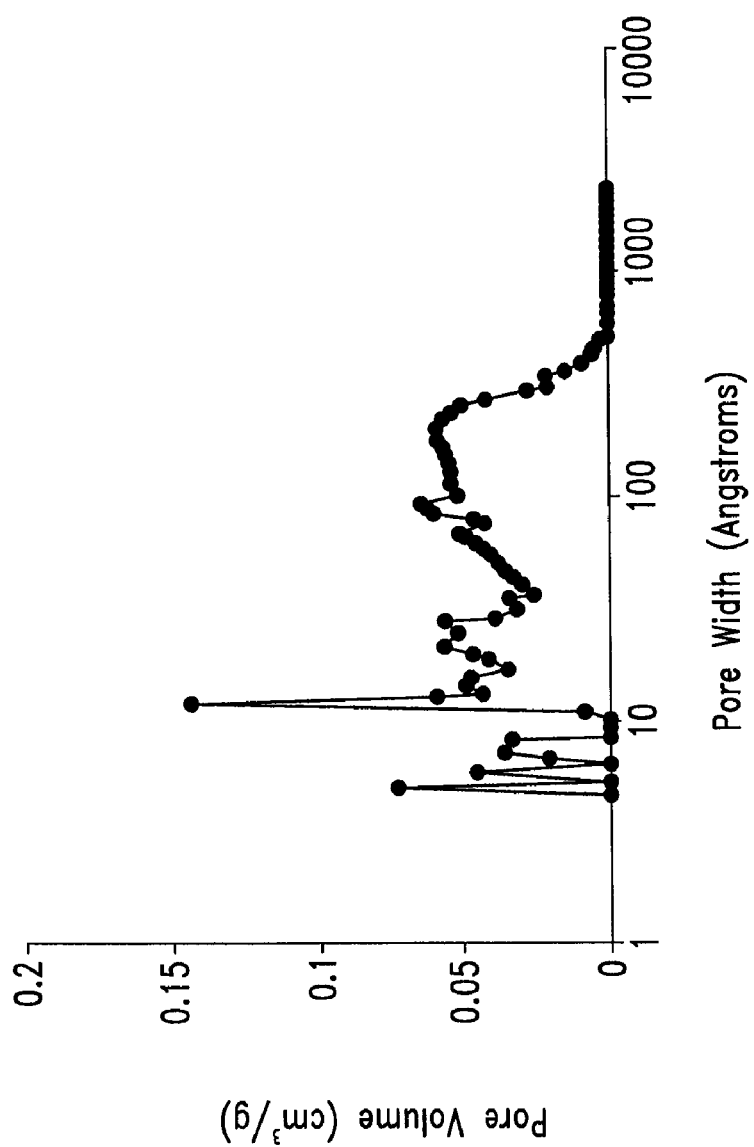
FIG. 13 is a plot of incremental pore volume of an ultrapure synthetic activated carbon material.

An example of the pore volume distribution for activated carbon produced from the RF ultrapure polymer gels described herein is presented in FIG. 13. In this case, the ultrapure synthetic activated carbon, namely 003-118-AC2 exhibits a pore volume distribution that is reflective of the pyrolyzed sample (see FIG. 11). These data are important in showing that ability to tune pore and surface characteristics in the ultrapure polymer gel will be translated to an ability to tune the characteristics in the ultrapure synthetic pyrolyzed and ultrapure synthetic activated carbon materials produced from the ultrapure polymer gels.

Example 11

Preparation of Dried Ultrapure Polymer Gel

According to the methods disclosed herein a ultrapure polymer gel was prepared from a binary solvent system comprised of water and acetic acid (75:25), resorcinol, formaldehyde, and ammonium acetate. The material was then placed at elevated temperature to allow for gellation to create a ultrapure polymer gel. Ultrapure polymer gel particles were created from the ultrapure polymer gel and passed through a 4750 micron mesh sieve, and said ultrapure polymer gel particles were frozen by immersion in liquid nitrogen, and loaded into a lyophilization tray at a loading of 3 to 7 g/in², and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 700 m²/g.

Example 12

Production of Ultrapure Pyrolyzed Synthetic Carbon Material from Dried Ultrapure Polymer Gel The dried gel as described in Example 11 was pyrolyzed by passage through a rotary kiln (alumina tube with 3.75 in inner diameter) at 850° C. with a nitrogen gas flow of 200 L/h rate. The weight loss upon pyrolysis was about 52%.

The surface area of the pyrolyzed dried ultrapure polymer gel was examined by nitrogen surface analysis using a surface area and porosity analyzer. The measured specific surface area using the standard BET approach was in the range of about 600 to 700 m²/g.

TABLE 9

Summary of activated carbon samples

| Sample | Pyrolyzed Gel Specific Surface Area (m²/g) | Activation Conditions | Activation (Total) Weight Loss (%) | Activated Carbon Specific Surface Area (m²/g) |
|---|---|---|---|---|
| 003-116-4 AC | 743 | 20 min 900° C. | 13 | 910 |
| 003-116-4 AC2 | | 110 min 900° C. | 87 | 2895 |
| 003-117-1 AC | 697 | 90 min 900° C. | 40 | 1565 |
| 003-117-3 AC | 548 | 45 min 900° C. | 38 | 1245 |
| 003-117-3 AC2 | | 90 min 900° C. | 98 | 2906 |
| 003-117-4 AC | 573 | 45 min 1000° C. | 41 | 1808 |
| 003-118-4 AC | 689 ± 24 | 100 min 900° C. | 25 | 1203 |
| 003-118-4 AC2 | | 45 min 1000° C. | 83 | 2716 |

Example 13

Production of Ultrapure Synthetic Activated Carbon

The pyrolyzed synthetic carbon material as described in Example 12 was activated by multiple passes through a rotary kiln (alumina tube with 2.75 in inner diameter) at 900° C. under a $CO_2$ flow rate of 30 L/min, resulting in a total weight loss of about 45%.

The surface area of the ultrapure synthetic activated carbon was examined by nitrogen surface analysis using a surface area and porosity analyzer. The measured specific surface area using the BET approach was in the range of about 1600 to 2000 $m^2/g$.

Example 14

Micronization of Ultrapure Synthetic Activated Carbon Via Jet Milling

The ultrapure synthetic activated carbon from Example 13 was jet milled using a Jet Pulverizer Micron Master 2 inch diameter jet mill. The conditions were about 0.7 lbs of ultrapure synthetic activated carbon per hour, nitrogen gas flow about 20 scf per min and about 100 psi pressure. The average particle size after jet milling was about 8 to 10 microns.

Example 15

Preparation of Dried Ultrapure Polymer Gel

According to the methods disclosed herein a ultrapure polymer gel was prepared from a binary solvent system comprised of water and acetic acid (75:25), resorcinol, formaldehyde, and ammonium acetate. The material was then placed at elevated temperature to allow for gellation to create a ultrapure polymer gel. Ultrapure polymer gel particles were created from the ultrapure polymer gel and passed through 4750 micron mesh sieve, and said ultrapure polymer gel particles were frozen by immersion in liquid nitrogen, and loaded into a lyophilization tray at a loading of 3 to 7 $g/in^2$, and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 700 $m^2/g$.

Example 16

Production of Ultrapure Pyrolyzed Synthetic Carbon Material from Dried Ultrapure Polymer Gel The dried gel as described in Example 15 was pyrolyzed by passage through a rotary kiln (quartz tube with a 3.75 inch inner diameter) at 850° C. with a nitrogen gas flow of 200 L/h rate. The weight loss upon pyrolysis was about 51%.

The surface area of the pyrolyzed dried ultrapure polymer gel was examined by nitrogen surface analysis using a surface area and porosity analyzer. The measured specific surface area using the standard BET approach was in the range of about 600 to 700 $m^2/g$.

Example 17

Preparation of Ultrapure Synthetic Activated Carbon

The pyrolyzed synthetic carbon material as described in Example 16 was activated by incubation at 900° C. in a silica tube (3.75 inch inner diameter) with 6.7 L/min $CO_2$ flow rate, to achieve a final weight loss (compared to the starting pyrolyzed carbon) of about 54%.

The surface area of the dried gel was examined by nitrogen surface analysis using a surface area and porosity analyzer. The measured specific surface area using the BET approach was in the range of about 1600 to 2000 $m^2/g$.

Example 18

Purity Analysis of Ultrapure Synthetic Activated Carbon & Comparison Carbons The ultrapure synthetic activated carbon samples were examined for their impurity content via proton induced x-ray emission (PIXE). PIXE is an industry-standard, highly sensitive and accurate measurement for simultaneous elemental analysis by excitation of the atoms in a sample to produce characteristic X-rays which are detected and their intensities identified and quantitated. PIXE is capable of detection of all elements with atomic numbers ranging from 11 to 92 (i.e., from sodium to uranium).

The PIXE impurity (Imp.) data for ultrapure synthetic activated carbons as disclosed herein as well as other activated carbons for comparison purposes is presented in Table 10. Sample 1 is the ultrapure synthetic activated carbon of Example 13, Sample 2 is the ultrapure synthetic micronized activated carbon of Example 14, Sample 3 is the ultrapure synthetic activated carbon of Example 17, Sample 4 is the ultrapure synthetic activated carbon of Example 35, Sample 5 is the ultrapure synthetic activated carbon of Example 38, Sample 6 is an activated carbon denoted "MSP-20" obtained from Kansai Coke and Chemicals Co., Ltd. (Kakogawa, Japan), Sample 7 is an activated carbon denoted "YP-50F (YP-17D)" obtained from Kuraray Chemical Co. (Osaka, Japan).

As seen in Table 10, the ultrapure synthetic activated carbons according to the instant disclosure have a lower PIXE impurity content and lower ash content as compared to other known activated carbon samples.

TABLE 10

Purity Analysis of Ultrapure Synthetic Activated Carbon & Comparison Carbons

| Impurity | Impurity Concentration (PPM) | | | | | | |
|---|---|---|---|---|---|---|---|
| | Sample 1 | Sample 2 | Sample 3 | Sample 4 | Sample 5 | Sample 6 | Sample 7 |
| Na | ND* | ND | ND | ND | ND | 353.100 | ND |
| Mg | ND | ND | ND | ND | ND | 139.000 | ND |
| Al | ND | ND | ND | ND | ND | 63.850 | 38.941 |
| Si | 53.840 | 92.346 | 25.892 | 17.939 | 23.602 | 34.670 | 513.517 |
| P | ND | ND | ND | ND | ND | ND | 59.852 |
| S | ND | ND | ND | ND | ND | 90.110 | 113.504 |
| Cl | ND | ND | ND | ND | ND | 28.230 | 9.126 |
| K | ND | ND | ND | ND | ND | 44.210 | 76.953 |
| Ca | 21.090 | 16.971 | 6.141 | 9.299 | 5.504 | ND | 119.804 |
| Cr | ND | ND | ND | ND | ND | 4.310 | 3.744 |
| Mn | ND | ND | ND | ND | ND | ND | 7.552 |
| Fe | 7.582 | 5.360 | 1.898 | 2.642 | 1.392 | 3.115 | 59.212 |
| Ni | 4.011 | 3.389 | 0.565 | ND | ND | 36.620 | 2.831 |
| Cu | 16.270 | 15.951 | ND | ND | ND | 7.927 | 17.011 |
| Zn | 1.397 | 0.680 | 1.180 | 1.130 | 0.942 | ND | 2.151 |
| Total | 104.190 | 134.697 | 35.676 | 31.010 | 31.44 | 805.142 | 1024.198 |
| (% Ash) | (0.018) | (0.025) | (<0.007) | (0.006) | (0.006) | (0.13) | (0.16) |

*ND = not detected by PIXE analysis

Example 19

Electrochemical Performance of Ultrapure Synthetic Activated Carbon

The ultrapure synthetic activated carbon of Example 13 (i.e., Sample #1) was analyzed for its electrochemical performance, specifically for its performance as an electrode material in an EDLC. Specific details regarding fabrication of electrodes, EDLC, and their testing are described below.

Capacitor electrodes comprised 99 parts by weight carbon particles (average particle size 5-15 microns) and 1 part by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

When complete, the capacitor was ready for electrical testing with a potentiostat/function generator/frequency response analyzer. Capacitance was measured by a constant current discharge method, comprising applying a current pulse for a known duration and measuring the resulting voltage profile. By choosing a given time and ending voltage, the capacitance was calculated from the following $C=It/\Delta V$, where C=capacitance, I=current, t=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported in Table 11 for discharge between 2.7 and 1.89V.

TABLE 11

Summary of capacitance performance parameters

| Capacitance Performance Parameters | Measured Value |
|---|---|
| Gravimetric Power* | 13.1 W/g |
| Volumetric Power* | 8.7 W/cc |
| Gravimetric Energy* | 4.8 Wh/kg |
| Volumetric Energy* | 3.2 Wh/liter |
| Gravimetric Capacitance @ RC = 5** | 22 F/g |
| Volumetric Capacitance @ RC = 5** | 15 F/cc |
| Gravimetric Capacitance @ RC = 20‡ | 27 F/g |
| Volumetric Capacitance @ RC = 20‡ | 18 F/cc |

*By constant current discharge from 2.7 to 1.89 volts with TEATFB in AN, 0.5 second time constant.
**By constant current discharge from 2.7 to 0.1 V, 5-second time constant.
‡By constant current discharge from 2.7 to 0.1 V, 20-second time constant.

Example 20

Preparation of Ultrapure Synthetic Activated Carbon

The pyrolyzed synthetic carbon material as described in Example 12 was activated by incubation at 900° C. in a silica tube (3.75 inch inner diameter) with 15 L/min $CO_2$ flow rate, to achieve a final weight loss (compared to the starting pyrolyzed carbon) of about 55%.

The surface area of the dried gel was examined by nitrogen surface analysis using a surface area and porosity analyzer. The measured specific surface area using the BET approach was in the range of about 2000 m²/g. The measured pore volume (Dv50) of the ultrapure synthetic activated carbon was at a pore size of about 1.8 nm. The measured pore volume (Dv5) of the ultrapure synthetic activated carbon was at a pore size of about 0.5 nm. The measured total pore volume of the ultrapure synthetic activated carbon was 1.42 cc/g.

Example 21

Micronization of Ultrapure Synthetic Activated Carbon

The ultrapure synthetic activated carbon from Example 20 was jet milled using a Jet Pulverizer Micron Master 2 inch diameter jet mill. The conditions were about 0.7 lbs of ultrapure synthetic activated carbon per hour, nitrogen gas flow about 20 scf per min and about 100 psi pressure. The average particle size (Dv50) after jet milling was about 6 microns. The Dv95 after jet milling was about 19 microns. The measured total ash content of the ultrapure synthetic activated carbon was 0.008%. The measured tap density of the ultrapure synthetic activated carbon was 0.22 g/cc.

Example 22

Electric Double Layer Capacitor Device Comprising Ultrapure Synthetic Activated Carbon The ultrapure synthetic activated carbon of Example 21 was used as an electrode material for an electric double later capacitor device as described below.

Capacitor electrodes comprised 99 parts by weight carbon particles (average particle size 5-15 microns) and 1 part by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

Example 23

Electrochemical Performance of an Electric Double Layer Capacitor Device Comprising Ultrapure Synthetic Activated Carbon The device described in Example 22 was subjected to electrical testing with a potentiostat/function generator/frequency response analyzer. Capacitance was measured by a constant current discharge method, comprising applying a current pulse for a known duration and measuring the resulting voltage profile over time. By choosing a given time and ending voltage, the capacitance was calculated from the following $C=It/\Delta V$, where $C$=capacitance, $I$=current, $t$=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported in Table 12 for discharge between 2.7 and 1.89V.

TABLE 12

Capacitance Performance Parameters of an EDLC Comprising Ultrapure Synthetic Activated Carbon

| Capacitance Performance Parameters | Measured Value |
|---|---|
| Gravimetric Power* | 28.8 W/g |
| Volumetric Power* | 14.4 W/cc |
| Gravimetric Energy* | 7.4 Wh/kg |
| Volumetric Energy* | 3.7 Wh/liter |
| Gravimetric Capacitance @ RC = 5** | 28 F/g |
| Volumetric Capacitance @ RC = 5** | 14 F/cc |
| Gravimetric Capacitance @ RC = 20‡ | 29 F/g |
| Volumetric Capacitance @ RC = 20‡ | 14 F/cc |

*By constant current discharge from 2.7 to 1.89 volts with TEATFB in AN, 0.5 second time constant.
**By constant current discharge from 2.7 to 0.1 V, 5-second time constant.
‡By constant current discharge from 2.7 to 0.1 V, 20-second time constant.

Example 24

Electrochemical Performance of Electric Double Layer Capacitor Devices Comprising Commercially Available Activated Carbon For comparison, devices were also constructed from two other commercially available activated carbons: Sample #6 and Sample #7. The gravimetric and volumetric power and gravimetric and volumetric energy performance data for these comparator carbons are presented in Table 13 for discharge between 2.7 and 1.89V.

TABLE 13

Capacitance Performance Parameters for Comparator Carbons

| Capacitance Performance Parameters | Measured Value Sample 6 | Measured Value Sample 7 |
|---|---|---|
| Gravimetric Power* | 11.2 W/g | 7.7 W/g |
| Volumetric Power* | 7.2 W/cc | 6.2 W/cc |
| Gravimetric Energy* | 3.5 Wh/kg | 3.0 Wh/kg |
| Volumetric Energy* | 2.2 Wh/liter | 2.4 Wh/liter |

*By constant current discharge from 2.7 to 1.89 volts with TEATFB in acetonitrile (AN), 0.5 second time constant.

Example 25

Electrochemical Performance of Electric Double Layer Capacitor Devices Comprising Commercially Available Activated Carbon as Compared to Device Comprising Ultrapure Synthetic Activated Carbon Under Voltage Hold Conditions For comparison, devices were constructed from either ultrapure synthetic activated carbon, as disclosed herein, or a commercially available activated carbon Sample #6. The ultrapure synthetic activated carbon was produced as described below.

The ultrapure synthetic activated carbon Sample #8 was produced from an RF ultrapure polymer gel prepared according to the disclosed methods (i.e., binary solvent system comprised of water and acetic acid (75:25), resorcinol, formaldehyde, and ammonium acetate) that was freeze thawed, re-frozen on a lyophilizer shelf at about −30° C., and then dried under vacuum. The dried ultrapure polymer gel was then pyrolyzed at 850° C. under nitrogen gas followed by activation at 950° C. under $CO_2$ gas flow, as consistent with processes described herein. The ultrapure synthetic activated carbon thus produced had a tap density of about 0.42 g/cm³, a specific surface area of about 1836 m²/g, a total pore volume of about 0.95 cm³/g, a fractional pore volume of about 54% for pores with diameter of 20 nm or less relative to total pore volume, a fractional pore volume of about 82% for pores with a diameter of 100 nm or less relative to total pore volume, a fractional pore surface of about 81% for pores with a diameter of 20 nm or less relative to total pore surface and a fractional pore surface area of about 97% for pores with a diameter of 100 nm or less relative to total pore surface area.

The ultrapure synthetic activated carbon Sample #9 was produced from a RF ultrapure polymer gel prepared according to the disclosed methods (i.e., binary solvent system comprised of water and acetic acid (75:25), resorcinol, formaldehyde, and ammonium acetate) that was frozen by submerging RF ultrapure polymer gel particles in liquid nitrogen, drying under vacuum, and then pyrolyzing in a rotary kiln with the temperature across the kiln having three hot zones set to temperatures from 650° C., 850° C. and 850° C., respectively, and the material was subjected pyrolysis under nitrogen gas flow followed by activation at 950° C. under $CO_2$ gas flow, as consistent with processes described herein. The ultrapure synthetic activated carbon had a tap density of about 0.42 g/cm³, a specific surface area of about 2148 m²/g, a total pore volume of greater than about 0.93 cm³/g, a fractional pore volume of about 72% for pores with a diameter of 20 nm or less relative to total pore volume, a fractional pore volume of about greater than 99% for pores with a diameter of 100 nm or less relative to total pore volume, a fractional pore surface of about 80% for pores with a diameter of 20 nm or less relative to total pore surface, and a fractional pore surface area of greater than about 99% for pores with a diameter of 100 nm or less relative to total pore surface area.

The devices were subjected to a voltage hold at 2.7 V for 24 hours at 65 C.°. The devices were then tested for their capacitance from a constant current discharge between 2.7 and 1.89 V at current densities of 0.5 A/g, 1 A/g, 4 A/g, and 8 A/g (acetonitrile solvent, TEATFB electrolyte).

The data for relative gravimetric capacitance remaining as compared to before the voltage hold process are presented in Table 14 (Sample #6) and Table 15 and Table 16 (for ultrapure synthetic activated carbon samples 8 and 9, respectively). The data show a dramatic decrease in the volumetric capacitance after the voltage hold process for the commercially available activated carbon. In contrast, the decrease in performance for the device containing ultrapure synthetic activated carbon was much lower.

TABLE 14

Capacitance Performance Parameters for Sample #6

| Sample | Current Density (A/g) | % Capacitance Before Voltage Hold | % Capacitance After Voltage Hold |
|---|---|---|---|
| Sample #6 | 0.5 | 100% | 69% |
| | 1 | 100% | 60% |

TABLE 14-continued

Capacitance Performance Parameters for Sample #6

| Sample | Current Density (A/g) | % Capacitance Before Voltage Hold | % Capacitance After Voltage Hold |
|---|---|---|---|
| | 4 | 100% | 20% |
| | 8 | 100% | 0.6% |

TABLE 15

Capacitance Performance Parameters for Ultrapure Synthetic Activated Carbon #8

| Sample | Current Density (A/g) | % Capacitance Before Voltage Hold | % Capacitance After Voltage Hold |
|---|---|---|---|
| Ultrapure Synthetic Activated Carbon #8 | 0.5 | 100% | 91% |
| | 1 | 100% | 87% |
| | 4 | 100% | 58% |
| | 8 | 100% | 18% |

TABLE 16

Capacitance Performance Parameters for Ultrapure Synthetic Carbon #9

| Sample | Current Density (A/g) | % Capacitance Before Voltage Hold | % Capacitance After Voltage Hold |
|---|---|---|---|
| Ultrapure Synthetic Activated Carbon #9 | 0.5 | 100% | 89% |
| | 1 | 100% | 85% |
| | 4 | 100% | 68% |
| | 8 | 100% | 54% |

Example 26

Electrochemical Performance of Electric Double Layer Capacitor Devices Comprising Commercially Available Activated Carbon as Compared to Device Comprising Ultrapure Synthetic Activated Carbon Under Voltage Hold Conditions For comparison, devices were constructed from either ultrapure synthetic activated carbon, as disclosed herein, or a commercially available activated carbon: Sample #6. The ultrapure synthetic activated carbon was produced as described below.

The ultrapure synthetic activated carbon Sample #10 was produced from an RF ultrapure polymer gel, prepared according to the disclosed methods (i.e. binary solvent system comprised of water and acetic acid (75:25), resorcinol, formaldehyde, and ammonium acetate), that was frozen on a lyophilizer shelf at about −50° C., and then dried under vacuum. The dried ultrapure polymer gel was then pyrolyzed at 850° C. under nitrogen gas followed by activation at 900° C. under $CO_2$ gas flow, as consistent with processes described herein. The ultrapure synthetic activated carbon thus produced had a tap density of about 0.307 g/cm³, a specific surface area of about 1600 m²/g, a total pore volume of about 1.02 cm³/g, a fractional pore volume of about 59% for pores with diameter of 2 nm or less relative to total pore volume, a fractional pore volume of about 76% for pores with a diameter of 10 nm or less relative to total pore volume, a fractional pore surface area of about 94% for pores with a diameter of 2 nm or less relative to total pore surface and a fractional pore surface area of about 98% for pores with a diameter of 10 nm or less relative to total pore surface area.

The devices were subjected to a voltage hold at 3.5V for 25 hours at room temperature. The devices were then tested for their capacitance from a constant current discharge between 3.5 and 0.1 V at constant currents of 1, 10, 50 mA (propylene carbonate solvent, TEATFB electrolyte).

The data for relative volumetric capacitance remaining as compared to before the voltage hold process are presented in Table 17 (for Sample #6) and Table 18 (for ultrapure synthetic activated carbon Sample #10). The data show a dramatic decrease in the volumetric capacitance after the voltage hold process for the commercially available activated carbon. In contrast, the decrease in performance for the device containing ultrapure synthetic activated carbon was much lower.

TABLE 17

Capacitance Performance Parameters for Sample #6

| Sample | Discharge Current (mA) | % Capacitance Before Voltage Hold | % Capacitance After Voltage Hold |
| --- | --- | --- | --- |
| Sample #6 | 1 | 100% | 59% |
|  | 10 | 100% | 63% |
|  | 50 | 100% | 3% |

TABLE 18

Capacitance Performance Parameters for Ultrapure Synthetic Activated Carbon Sample #10

| Sample | Discharge Current (mA) | % Capacitance Before Voltage Hold | % Capacitance After Voltage Hold |
| --- | --- | --- | --- |
| Ultrapure Synthetic Activated Carbon #10 | 1 | 100% | 101% |
|  | 10 | 100% | 72% |
|  | 50 | 100% | 59% |

Example 27

Electrochemical Performance of Electric Double Layer Capacitor Devices Comprising Commercially Available Activated Carbon as Compared to Device Comprising Ultrapure Synthetic Activated Carbon Under Cycling Conditions For comparison, devices were constructed from ultrapure synthetic activated carbon materials as disclosed herein or a commercially available activated carbon: Sample #6. The gravimetric and volumetric power and gravimetric and volumetric energy performance data for these commercially available carbons are presented in Table 13 for discharge between 2.7 and 1.89V. The ultrapure synthetic activated carbon was produced as described below.

The ultrapure synthetic activated carbon Sample #11 was produced from an RF ultrapure polymer gel, prepared according to the disclosed methods (i.e., binary solvent system comprised of water and acetic acid (75:25), resorcinol, formaldehyde, and ammonium acetate), that was ground into particles, frozen on a lyophilizer shelf at about −30° C., dried under vacuum, and then pyrolyzed at 850° C. under nitrogen gas followed by activation at 900° C. under $CO_2$ gas flow, as consistent with processes described herein. The ultrapure synthetic activated carbon had a tap density of about 0.28 g/cm$^3$, a specific surface area of about 1754 m$^2$/g, a total pore volume of about 1.15 cm$^3$/g, a fractional pore volume of about 53% for pores with a diameter of 20 nm or less relative to total pore volume, a fractional pore volume of about 76% for pores with a diameter of 100 nm or less relative to total pore volume, a fractional pore surface of about 91% for pores with a diameter of 20 nm or less relative to total pore surface and a fractional pore surface area of about 99% for pores with a diameter of 100 nm or less relative to total pore surface area.

The devices were subjected to several thousand cycling events between 2 V and 1 V (acetonitrile solvent, TEATFB electrolyte). The data demonstrate that the ultrapure synthetic activated carbon Sample #11 as disclosed herein retains 99.78% of it's original capacitance after 3000 cycles. The data demonstrates that Sample #6 electrode prepared in exactly the same way has retained only 97.11% of its original capacitance after 2600 cycles. The degradation from 100% to 99.78% is almost perfectly linear in both cases and so if it is extrapolated out to 10,000 cycles, the ultrapure carbon would retain 99.25% of it's original capacitance and the Sample #8 capacitor would retain only 88.89% of it's original capacitance. This indicates that the ultrapure synthetic carbon is substantially more stable in the first several thousand cycles as opposed to Sample #6 (Cycling data at 4 A/g between 2V and 1V in ACN). As can be seen, the ultrapure synthetic carbon exhibits a dramatically improved retention of capacitance after cycling compared to non-ultrapure carbons.

Example 28

Preparation of Dried Ultrapure Polymer Gel

According to the methods disclosed herein a ultrapure polymer gel was prepared from a binary solvent system comprised of water and acetic acid (75:25), resorcinol, formaldehyde, and ammonium acetate. The material was then placed at elevated temperature to allow for gellation to create an ultrapure polymer gel. Ultrapure polymer gel particles were created from the ultrapure polymer gel and passed through a Stedman Aurora crusher outfitted with corrosion resistant stainless steel blades and ⅝" screen. Ultrapure polymer gel particles were frozen by immersion in liquid nitrogen, and loaded into a lyophilization tray at a loading of 3 to 7 g/in$^2$, and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 700 m$^2$/g.

Example 29

Production of Ultrapure Pyrolyzed Synthetic Carbon Material from Dried Ultrapure Polymer Gel The dried gel as described in Example 28 was pyrolyzed by passage through a rotary kiln (metal tube with mullite liner with 4.18 inch inner diameter) at 0.7 kg/h at 680 to 850° C. gradient hot-zones with a nitrogen gas flow of 4,250 L/h rate. The weight loss upon pyrolysis was about 50% to 52%.

The surface area of the pyrolyzed dried ultrapure polymer gel was examined by nitrogen surface analysis using a surface area and porosity analyzer. The measured specific surface area using the standard BET approach was in the range of about 600 to 700 m$^2$/g.

Example 30

Preparation of Ultrapure Synthetic Activated Carbon

The pyrolyzed synthetic carbon material as described in Example 29 was activated by incubation at 900° C. in a quartz tube (3.75 inch inner diameter) with 6.7 L/min $CO_2$ flow rate, to achieve a final weight loss (compared to the starting pyrolyzed carbon) of about 55%.

The surface area of the activated carbon material was examined by nitrogen surface analysis using a surface area and porosity analyzer. The measured specific surface area using the BET approach was in the range of about 2500 $m^2/g$. The measured pore volume (Dv50) of the ultrapure synthetic activated carbon was at a pore size of about 1.8 nm. The measured pore volume (Dv5) of the ultrapure synthetic activated carbon was at a pore size of about 0.5 nm. The measured total pore volume of the ultrapure synthetic activated carbon was 1.07 cc/g.

Example 31

Electric Double Layer Capacitor Device Comprising Ultrapure Synthetic Activated Carbon The ultrapure synthetic activated carbon of Example 30 was used as an electrode material for an electric double later capacitor device as described below.

Capacitor electrodes comprised 97 parts by weight carbon particles (average particle size 5-15 microns) and 3 parts by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

Standard 2325 stainless steel coin cell parts were used in coin cell assembly. A 0.625 inch diameter carbon coated aluminum disk was used as a contact resistance reducer in the positive cap. A 0.625 inch diameter carbon electrode on top of the aluminum disk was saturated with several drops of electrolyte comprising 1.0 M tetraethylene ammonium tetrafluoroborate in acetonitrile. Two pieces of cellulose based porous separator with 0.825 inch from NKK, Inc were then placed on top of the carbon disk. Next, the second piece of carbon electrode was placed on the separator and one more drop of electrolyte was added to wet the top surface. After that the second carbon coated aluminum contact resistance reducer was put on the electrode. Then one stainless spacer and spring was placed sequentially and the whole stack was covered in the negative cap with a polypropylene grommet. The whole cell stack was then put onto a hydraulic pressure operated crimper and crimped for 1 minute at full pressure to form a sealed coin cell.

Example 32

Electrochemical Performance of an Electric Double Layer Capacitor Device Comprising Ultrapure Synthetic Activated Carbon The device described in Example 31 was subjected to electrical testing with a potentiostat/function generator/frequency response analyzer. Capacitance was measured by a constant current discharge method, comprising applying a current pulse for a known duration and measuring the resulting voltage profile over time. By choosing a given time and ending voltage, the capacitance was calculated from the following $C=It/\Delta V$, where C=capacitance, I=current, t=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported in Table 19 for discharge between 2.7 and 1.89V.

TABLE 19

Capacitance Performance Parameters of an EDLC Comprising Ultrapure Synthetic Activated Carbon

| Capacitance Performance Parameters | Measured Value |
| --- | --- |
| Gravimetric Power* | 16.9 W/g |
| Volumetric Power* | 11.7 W/cc |
| Gravimetric Energy* | 20.6 Wh/kg |
| Volumetric Energy* | 14.3 Wh/liter |
| Gravimetric Capacitance @ 0.5 A/g | 30.5 F/g |
| Volumetric Capacitance @ 0.5 A/g | 21.4 F/cc |
| Gravimetric Capacitance @ 1.0 A/g | 29.6 F/g |
| Volumetric Capacitance @ 1.0 A/g | 20.8 F/cc |
| Gravimetric Capacitance @ 4.0 A/g | 24.6 F/g |
| Volumetric Capacitance @ 4.0 A/g | 17.2 F/cc |
| Gravimetric Capacitance @ 8.0 A/g | 18.7 F/g |
| Volumetric Capacitance @ 8.0 A/g | 13.1 F/cc |

*By constantcurrent discharge from 2.7 to 1.89 volts with TEATFB in AN.

Example 33

Preparation of Dried Ultrapure Polymer Gel

According to the methods disclosed herein an ultrapure polymer gel was prepared from a binary solvent system comprised of water and acetic acid (75:25), resorcinol, formaldehyde, and ammonium acetate. The material was then placed at elevated temperature to allow for gellation to create a ultrapure polymer gel. Ultrapure polymer gel particles were created from the ultrapure polymer gel and passed through 4750 micron mesh sieve, and said ultrapure polymer gel particles were loaded into a lyophilization tray at a loading of 3 to 7 $g/in^2$, frozen on a lyophilizer shelf which was pre-cooled to about −40° C., and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 600 $m^2/g$.

Example 34

Production of Ultrapure Pyrolyzed Synthetic Carbon Material from Dried Ultrapure Polymer Gel The dried gel as described in Example 11 was pyrolyzed by passage through a rotary kiln (quartz tube with 3.75 in inner diameter) at 850° C. with a nitrogen gas flow of 200 L/h rate. The weight loss upon pyrolysis was about 52%.

The surface area of the pyrolyzed dried ultrapure polymer gel was examined by nitrogen surface analysis using a surface area and porosity analyzer. The measured specific surface area using the standard BET approach was in the range of about 500 to 700 m²/g.

Example 35

Production of Ultrapure Synthetic Activated Carbon

The pyrolyzed synthetic carbon material as described in Example 12 was activated in a batch process process through a rotary kiln (quartz tube with 3.75 in inner diameter) at 900° C. under a $CO_2$ flow rate of 400 L/h, resulting in a total weight loss of about 45%.

The surface area of the ultrapure synthetic activated carbon was examined by nitrogen surface analysis using a surface area and porosity analyzer. The measured specific surface area using the BET approach was in the range of about 1600 to 2000 m²/g. This carbon will be referred to herein as Sample 4.

Example 36

Preparation of Dried Ultrapure Polymer Gel

According to the methods disclosed herein a ultrapure polymer gel was prepared from a binary solvent system comprised of water and acetic acid (75:25), resorcinol, formaldehyde, and ammonium acetate. The material was then placed at elevated temperature to allow for gellation to create a ultrapure polymer gel. Ultrapure polymer gel particles were created from the ultrapure polymer gel and passed through 4750 micron mesh sieve, and said ultrapure polymer gel particles were loaded into a lyophilization tray at a loading of 3 to 7 g/in², frozen on a lyophilizer shelf which was pre-cooled to about –40 C, and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 700 m²/g.

Example 37

Production of Ultrapure Pyrolyzed Synthetic Carbon Material from Dried Ultrapure Polymer Gel The dried gel as described in Example 11 was pyrolyzed by passage through a rotary kiln (quartz tube with 3.75 in inner diameter) at 850° C. with a nitrogen gas flow of 200 L/h rate. The weight loss upon pyrolysis was about 52%.

The surface area of the pyrolyzed dried ultrapure polymer gel was examined by nitrogen surface analysis using a surface area and porosity analyzer. The measured specific surface area using the standard BET approach was in the range of about 500 to 700 m²/g.

Example 38

Production of Ultrapure Synthetic Activated Carbon

The pyrolyzed synthetic carbon material as described in Example 12 was activated in a batch process through a rotary kiln (quartz tube with 3.75 in inner diameter) at 900° C. under a $CO_2$ flow rate of 400 L/h, resulting in a total weight loss of about 44%.

The surface area of the ultrapure synthetic activated carbon was examined by nitrogen surface analysis using a surface area and porosity analyzer. The measured specific surface area using the BET approach was in the range of about 1600 to 2000 m²/g. This carbon will be referred to herein as Sample 5.

Example 39

Measurement of H, N, O for Ultrapure Synthetic Activated Carbon

The synthetic activated carbon material identified as Sample 1 was analyzed for H, N and O at Elemental Analysis, Inc. (Lexington, Ky.). The data showed that the hydrogen content was 0.25%, the nitrogen content was 0.21%, and the oxygen content was 0.53%.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An ultrapure synthetic carbon material comprising a BET specific surface area of at least 1500 m²/g and a total impurity content of less than 500 ppm of elements having atomic numbers ranging from 11 to 92 as measured by proton induced x-ray emission.

2. The carbon material of claim 1, wherein the carbon material is an ultrapure synthetic amorphous carbon material.

3. The carbon material of claim 1, wherein the carbon material comprises a total impurity content of less than 200 ppm of elements having atomic numbers ranging from 11 to 92 as measured by proton induced x-ray emission.

4. The carbon material of claim 1, wherein the ash content of the carbon material is less than 0.03% as calculated from proton induced x-ray emission data.

5. The carbon material of claim 1, wherein the ash content of the carbon material is less than 0.01% as calculated from proton induced x-ray emission data.

6. The carbon material of claim 1, wherein the carbon material comprises at least 95% carbon by weight as measured by combustion analysis and proton induced x-ray emission.

7. The carbon material of claim 1, wherein the carbon material comprises less than 3 ppm iron as measured by proton induced x-ray emission.

8. The carbon material of claim 1, wherein the carbon material comprises less than 1 ppm nickel as measured by proton induced x-ray emission.

9. The carbon material of claim 1, wherein the carbon material comprises less than 5 ppm sulfur as measured by proton induced x-ray emission.

10. The carbon material of claim 1, wherein the carbon material comprises less than 1 ppm chromium as measured by proton induced x-ray emission.

11. The carbon material of claim 1, wherein the carbon material comprises less than 1 ppm copper as measured by proton induced x-ray emission.

12. The carbon material of claim 1, wherein the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission.

13. The carbon material of claim 1, wherein the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc as measured by proton induced x-ray emission.

14. The carbon material of claim 1, wherein the carbon material comprises less than 3.0% oxygen, less than 0.1% nitrogen and less than 0.5% hydrogen as determined by combustion analysis.

15. The carbon material of claim 1, wherein the carbon material comprises less than 1.0% oxygen as determined by combustion analysis.

16. The carbon material of claim 1, wherein the carbon material comprises a pyrolyzed ultrapure polymer cryogel.

17. The carbon material of claim 1, wherein the carbon material comprises an activated ultrapure polymer cryogel.

18. The carbon material of claim 1, wherein the carbon material comprises a pore volume of at least 0.7 cc/g.

19. The carbon material of claim 1, wherein the carbon material comprises a BET specific surface area of at least 2000 m$^2$/g.

20. The carbon material of claim 1, wherein the carbon material comprises a BET specific surface area of at least 2400 m$^2$/g.

21. A device comprising an ultrapure synthetic carbon material, wherein the ultrapure synthetic carbon material comprises a BET specific surface area of at least 1500 m$^2$/g and a total impurity content of less than 500 ppm of elements having atomic numbers ranging from 11 to 92 as measured by proton induced x-ray emission.

22. The device of claim 21, wherein the carbon material is an ultrapure synthetic amorphous carbon material.

23. The device of claim 21, wherein the device is a battery.

24. The device of claim 23, wherein the device is a lithium/carbon battery, zinc/carbon, lithium air battery or lead acid battery.

25. The device of claim 21, wherein the device is an electric double layer capacitor (EDLC) device comprising:
a) a positive electrode and a negative electrode wherein each of the positive and the negative electrodes comprise the ultrapure synthetic carbon material;
b) an inert porous separator; and
c) an electrolyte;
wherein the positive electrode and the negative electrode are separated by the inert porous separator.

26. The device of claim 25, wherein the EDLC device comprises a gravimetric power of at least 15 W/g.

27. The device of claim 25, wherein the EDLC device comprises a volumetric power of at least 10 W/cc.

28. The device of claim 25, wherein the EDLC device comprises a gravimetric energy of at least 20.0 Wh/kg.

29. The device of claim 25, wherein the EDLC device comprises a volumetric energy of at least 10.0 Wh/liter.

30. The device of claim 25, wherein the EDLC device comprises a gravimetric capacitance of at least 25 F/g as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

31. The device of claim 25, wherein the EDLC device comprises a volumetric capacitance of at least 20 F/cc as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

32. The device of claim 25, wherein the carbon material comprises a total impurity content of less than 200 ppm of elements having atomic numbers ranging from 11 to 92 as measured by proton induced x-ray emission.

33. The device of claim 25, wherein the ash content of the carbon material is less than 0.03% as calculated from proton induced x-ray emission data.

34. The device of claim 25, wherein the ash content of the carbon material is less than 0.01% as calculated from proton induced x-ray emission data.

35. The device of claim 25, wherein the carbon material comprises at least 95% carbon as measured by combustion analysis and proton induced x-ray emission.

36. The device of claim 25, wherein the carbon material comprises less than 3 ppm iron as measured by proton induced x-ray emission.

37. The device of claim 25, wherein the carbon material comprises less than 1 ppm nickel as measured by proton induced x-ray emission.

38. The device of claim 25, wherein the carbon material comprises less than 5 ppm sulfur as measured by proton induced x-ray emission.

39. The device of claim 25, wherein the carbon material comprises less than 1 ppm chromium as measured by proton induced x-ray emission.

40. The device of claim 25, wherein the carbon material comprises less than 1 ppm copper as measured by proton induced x-ray emission.

41. The device of claim 25, wherein the carbon material comprises less than 100 ppm sodium, less than 300 ppm silicon, less than 100 ppm calcium, less than 50 ppm sulfur, less than 20 ppm iron, less than 10 ppm nickel, less than 140 ppm copper, less than 5 ppm chromium and less than 5 ppm zinc as measured by proton induced x-ray emission.

42. The device of claim 25, wherein the carbon material comprises an activated ultrapure polymer cryogel.

43. The device of claim 25, wherein the carbon material comprises a BET specific surface area of at least 2000 m$^2$/g.

44. The device of claim 25, wherein the carbon material comprises a BET specific surface area of at least 2400 m$^2$/g.

45. An electrode comprising an ultrapure synthetic carbon material and a binder, wherein the ultrapure synthetic carbon material comprises a BET specific surface area of at least 1500 m$^2$/g and a total impurity content of less than 500 ppm of elements having atomic numbers ranging from 11 to 92 as measured by proton induced x-ray emission.

46. The electrode of claim 45, wherein the carbon material is an ultrapure synthetic amorphous carbon material.

* * * * *

UNITED STATES PATENT AND TRADEMARK OFFICE
CERTIFICATE OF CORRECTION

PATENT NO.        : 8,404,384 B2                    Page 1 of 1
APPLICATION NO.   : 12/829282
DATED             : March 26, 2013
INVENTOR(S)       : Aaron M. Feaver et al.

It is certified that error appears in the above-identified patent and that said Letters Patent is hereby corrected as shown below:

On the Title Page

Item (56):
"JP    2004-5146367 A    5/2004" should read, --JP    2004-514637 A    5/2004--.

Item (56):
"Babićet al., "Characterization of carbon cryogel synthesized by sol-gel polycondensation and freeze-drying," *Carbon 42*:2617-2624, 2004." should read, --Babić et al., "Characterization of carbon cryogel synthesized by sol-gel polycondensation and freeze-drying," *Carbon 42*:2617-2624, 2004.--.

Item (56):
"Babićet al., "Characterization of carbon cryogels synthesized by sol-gel polycondensation," *J. Serb. Chem. Soc. 70*(1):21-31, 2005." should read, --Babić et al., "Characterization of carbon cryogels synthesized by sol-gel polycondensation," *J. Serb. Chem. Soc. 70*(1):21-31, 2005.--.

Signed and Sealed this
Fourth Day of February, 2014

Michelle K. Lee
*Deputy Director of the United States Patent and Trademark Office*